US011563927B2

United States Patent
Ren

(10) Patent No.: US 11,563,927 B2
(45) Date of Patent: Jan. 24, 2023

(54) MOUNTING CALIBRATION OF STRUCTURED LIGHT PROJECTOR IN MONO CAMERA STEREO SYSTEM

(71) Applicant: Ambarella International LP, Santa Clara, CA (US)

(72) Inventor: Ke-Ke Ren, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 108 days.

(21) Appl. No.: 17/236,340

(22) Filed: Apr. 21, 2021

(65) Prior Publication Data
US 2022/0337802 A1  Oct. 20, 2022

(30) Foreign Application Priority Data

Apr. 16, 2021 (CN) .......................... 202110410126.6

(51) Int. Cl.
| | |
|---|---|
| *H04N 13/128* | (2018.01) |
| *G06T 7/521* | (2017.01) |
| *G01B 11/25* | (2006.01) |
| *G06T 7/593* | (2017.01) |
| *H04N 13/122* | (2018.01) |
| *G06T 7/80* | (2017.01) |

(52) U.S. Cl.
CPC ....... *H04N 13/128* (2018.05); *G01B 11/2504* (2013.01); *G06T 7/521* (2017.01); *G06T 7/593* (2017.01); *G06T 7/80* (2017.01); *H04N 13/122* (2018.05); *G06T 2207/10012* (2013.01); *G06T 2207/10021* (2013.01); *G06T 2207/20228* (2013.01)

(58) Field of Classification Search
CPC ............... H04N 13/128; H04N 13/122; G01B 11/2504; G06T 7/521; G06T 7/593; G06T 7/80; G06T 2207/10012; G06T 2207/10021; G06T 2207/20228
See application file for complete search history.

(56) References Cited

U.S. PATENT DOCUMENTS

2019/0287259 A1* 9/2019 Tankovich ........... H04N 13/204

* cited by examiner

*Primary Examiner* — Farzana Hossain
(74) *Attorney, Agent, or Firm* — Christopher P. Maiorana, PC

(57) ABSTRACT

An apparatus includes an interface and a processor. The interface may be configured to receive pixel data. The processor may be configured to (i) generate a reference image and a target image from said pixel data, (ii) perform disparity operations on the reference image and the target image, and (iii) build a disparity angle map in response to the disparity operations. The disparity operations may comprise (a) selecting a plurality of grid pixels, (b) measuring a disparity angle for each grid pixel, (c) calculating a plurality of coefficients by resolving a surface formulation for a disparity angle map of the grid pixels, and (d) generating values in a disparity angle map for the pixel data utilizing the coefficients.

20 Claims, 12 Drawing Sheets

600

602

604

MOUNTING CALIBRATION OF STRUCTURED LIGHT PROJECTOR IN MONO CAMERA STEREO SYSTEM

This application relates to Chinese Application No. 202110410126.6, filed Apr. 16, 2021, which is incorporated by reference in its entirety.

FIELD OF THE INVENTION

The invention relates to stereo vision generally and, more particularly, to a method and/or apparatus for implementing a mounting calibration of a structured light projector in a mono camera stereo system.

BACKGROUND

A structured light projector is a dot light that scatters light speckles to an object. The speckle pattern captured by a camera sensor will shift horizontally when the object moves toward the camera or away from the camera. If a reference image of a speckle pattern on an object is captured at a certain distance (R) and the object is moved from the distance R to a second distance (X), the moving distance (M=X−R) can be calculated by measuring the shift of speckle pattern captured by the camera sensor. The measurement of the shift of the speckle pattern between two captured images is the principle on which a mono camera stereo system operates. The shift offset of the speckle pattern is generally referred to as disparity.

Compared to a stereo solution utilizing dual cameras, the mono camera stereo system often performs with lower costs, smaller size, and lower power. Although the mono camera stereo system has the above advantages, the mono camera stereo system restricts the mounting position of the structured light projector relative to the camera.

It would be desirable to implement a mounting calibration of a structured light projector in a mono camera stereo system.

SUMMARY

The invention encompasses an aspect concerning an apparatus comprising an interface and a processor. The interface may be configured to receive pixel data. The processor may be configured to (i) generate a reference image and a target image from the pixel data, (ii) perform disparity operations on the reference image and the target image, and (iii) build a disparity angle map in response to the disparity operations. The disparity operations may comprise (a) selecting a plurality of grid pixels, (b) measuring a disparity angle for each grid pixel, (c) calculating a plurality of coefficients by resolving a surface formulation for a disparity angle map of the grid pixels, and (d) generating values in a disparity angle map for the pixel data utilizing the coefficients.

In some embodiments of the apparatus aspect described above, the processor may be further configured to build a disparity map by performing pattern shift matching using the disparity angle map. In some embodiments where the processor performs pattern shift matching using the disparity angle map, the processor may be further configured to perform the pattern shift matching by applying an oriented block matching process utilizing the disparity angle map.

In some embodiments of the apparatus aspect described above, the processor may be further configured to build the disparity angle map by performing an offline calibration procedure comprising capturing a first image containing a speckle pattern projected on a wall at a first distance and capturing a second image containing the speckle pattern projected on said wall at a second distance.

In some embodiments of the apparatus aspect described above, the processor may be further configured to build the disparity angle map by performing an online calibration procedure comprising capturing a first image containing a speckle pattern projected on an object at a first distance and capturing a second image containing the speckle pattern projected on the object at a second distance.

In some embodiments of the apparatus aspect described above, the processor may be further configured to calculate the plurality of coefficients by resolving the surface formulation for the disparity angle map of the grid pixels by applying a regression algorithm to a parametric surface containing the grid pixels. In some embodiments, the regression algorithm comprises a least square regression algorithm. In some embodiments, the parametric surface comprises a cubic parametric surface.

In some embodiments of the apparatus aspect described above, the apparatus may further comprise a camera configured to generate the pixel data and a structured light projector configured to project a speckle pattern. In some embodiments where the apparatus further comprises a camera and a structured light projector, the processor may be further configured to generate the reference image comprising the speckle pattern projected on an object at a first distance from the camera, generate the target image comprising the speckle pattern projected on the object at a second distance from the camera, and measure the disparity angle for each grid pixel by determining a pattern shift between the speckle pattern in the reference image and the speckle pattern in the target image.

The invention also encompasses an aspect concerning a method of mounting calibration of a structured light projector in a mono camera stereo system comprising (i) receiving pixel data at an interface, (ii) generating a reference image and a target image from the pixel data using a processor, (iii) performing disparity operations on the reference image and the target image, and (iv) building a disparity angle map in response to the disparity operations, where the disparity operations comprise (a) selecting a plurality of grid pixels, (b) measuring a disparity angle for each grid pixel, (c) calculating a plurality of coefficients by resolving a surface formulation for the disparity angle map of the grid pixels, and (d) generating values in a disparity angle map for the pixel data utilizing the coefficients.

In some embodiments of the method aspect described above, the method further comprises building a disparity map using the processor by performing pattern shift matching using the disparity angle map. In some embodiments, the method further comprises performing the pattern shift matching by applying an oriented block matching process utilizing the disparity angle map.

In some embodiments of the method aspect described above, the method further comprises building the disparity angle map by performing an offline calibration procedure comprising capturing a first image containing a speckle pattern projected on a wall at a first distance and capturing a second image containing the speckle pattern projected on the wall at a second distance.

In some embodiments of the method aspect described above, the method further comprises building the disparity angle map by performing an online calibration procedure comprising capturing a first image containing a speckle pattern projected on an object at a first distance and capturing a second image containing the speckle pattern projected on the object at a second distance.

In some embodiments of the method aspect described above, the method further comprises calculating the plurality of coefficients by resolving the surface formulation for the disparity angle map of the grid pixels by applying a regression algorithm to a parametric surface containing the grid pixels. In some embodiments, the regression algorithm comprises a least square regression algorithm. In some embodiments, the parametric surface comprises a cubic parametric surface.

In some embodiments of the method aspect described above, the method further comprises generating the pixel data using a camera and projecting a speckle pattern on an object using a structured light projector. In some embodiments, the method further comprises (i) generating the reference image comprising the speckle pattern projected on an object at a first distance from the camera, (ii) generating the target image comprising the speckle pattern projected on the object at a second distance from the camera, and (iii) measuring the disparity angle for each grid pixel using the processor to determine a pattern shift between the speckle pattern in the reference image and the speckle pattern in the target image.

BRIEF DESCRIPTION OF THE FIGURES

Embodiments of the invention will be apparent from the following detailed description and the appended claims and drawings.

DETAILED DESCRIPTION OF THE EMBODIMENTS

Embodiments of the present invention include providing a mounting calibration of a structured light projector in a mono camera stereo system that may (i) overcome mounting restrictions, (ii) reduce dependency of disparity measurements on structured light projector mounting, (iii) generate a disparity angle map, (iv) implement an oriented block matching (OBM) algorithm, and/or (v) be implemented as one or more integrated circuits.

Figure 1:
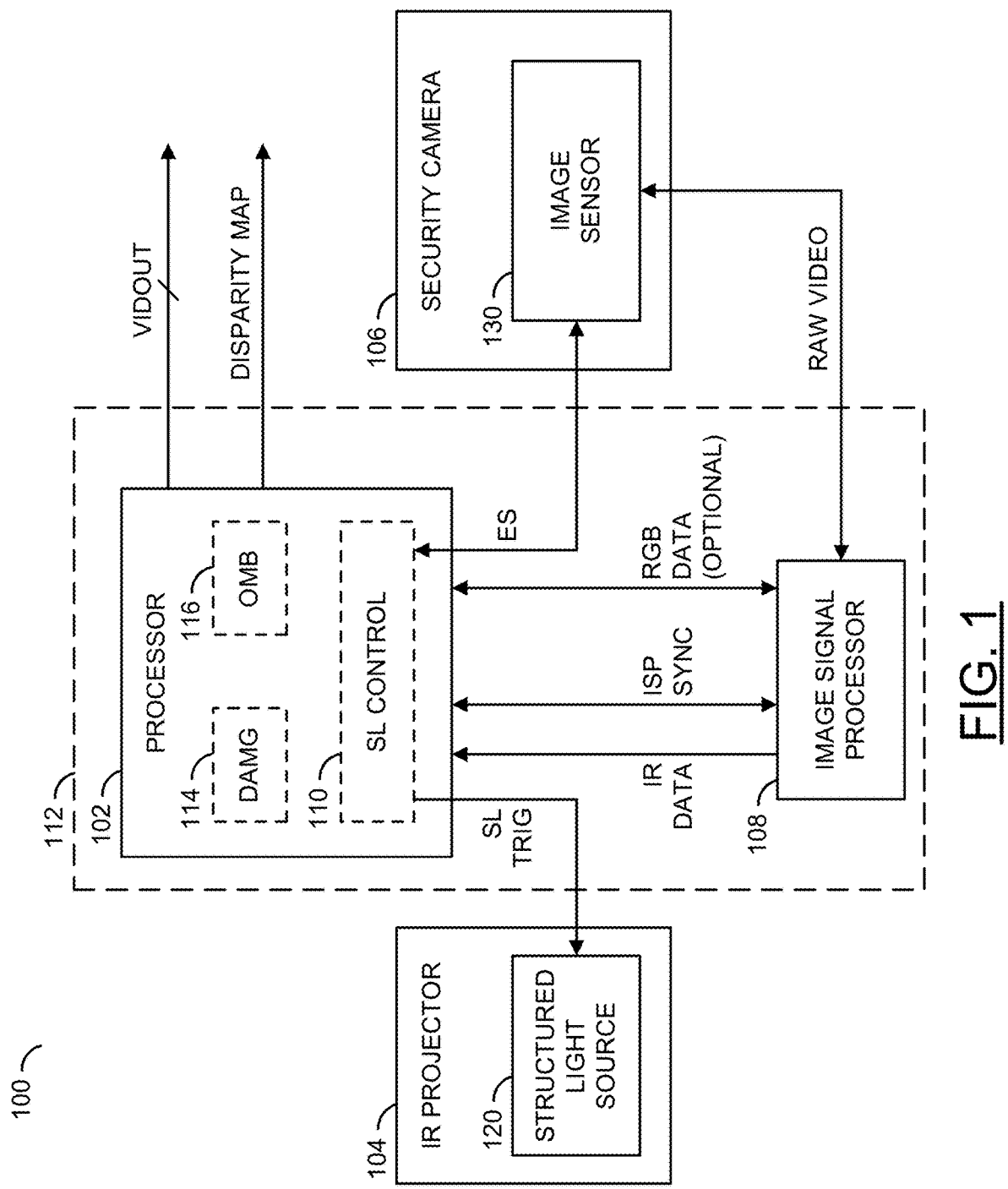
FIG. 1 is a diagram illustrating a mono camera stereo system in accordance with an example embodiment of the invention.

Referring to FIG. 1, a block diagram of an apparatus is shown illustrating an example implementation of a mono camera stereo system in accordance with an example embodiment of the invention. In an example, a system 100 may implement a 3D sensing platform including a mono camera stereo system using an infrared (IR) or RGB-IR image sensor with a structured light projector. In an example, the system 100 may comprise a block (or circuit) 102, a block (or circuit) 104, a block (or circuit) 106, and/or a block (or circuit) 108. The circuit 102 may be implemented as a control circuit (e.g., dedicated circuitry, embedded controller, processor, microprocessor, etc.). The circuit 104 may implement an infrared structured light projector. The circuit 106 may implement a security/surveillance camera (or module). The circuit 108 may implement an image signal processing (ISP) circuit (or processor or frontend). In an example, the circuit 108 may be capable of performing multiple channel ISP.

In an example, the circuit 102 may include a block (or circuit) 110. The block 110 may implement a structured light (SL) control circuit (or function). In another example, the circuits 102 and 110 may be implemented as separate circuit cores that may be instantiated on a single integrated circuit substrate (or die) or in a multi chip module (MCM). In an example, the circuits 102 and 108 (and the circuit 110 when separate from the circuit 102) may be implemented in a single integrated circuit or system-on-chip (SOC) 112.

In various embodiments, the circuit 102 may be configured to implement a disparity angle map generation (DAMG) technique 114 in accordance with an example embodiment of the invention. In an example, the disparity angle map generation (DAMG) technique 114 may be implemented using hardware, software, or a combination of hardware and software. In an embodiment implementing the disparity angle map generation (DAMG) technique 114 in software or as a combination of hardware and software, computer executable instructions implementing the disparity angle map generation (DAMG) technique 114 may be stored on the circuit 102 or in a memory associated with the circuit 102. In various embodiments, the circuit 102 may be further configured to implement an oriented block matching (OMB) technique 116 in accordance with an example embodiment of the invention. In an example, the oriented block matching (OMB) technique 116 may be implemented using hardware, software, or a combination of hardware and software. In an embodiment implementing the oriented block matching (OMB) technique 116 in software or as a combination of hardware and software, computer executable instructions implementing the oriented block matching (OMB) technique 116 may be stored on the circuit 102 or in a memory associated with the circuit 102.

In various embodiments, the circuit 102 may be connected to the IR structured light projector 104, the camera 106, and the ISP circuit 108. The camera 106 may also be connected to the ISP circuit 108. In an example, the circuit 102 generally provides a central control mechanism to synchronize timing of the IR projector 104 and the camera 106. In an example, the circuit 102 may be configured to control a structured light source 120 of the IR projector 104. In various embodiments, the circuit 102 may be further configured to perform a structured light projector mounting calibration routine (algorithm) utilizing images captured by the camera 106. In one example, the mounting calibration may be performed offline using images of a wall, one at a near (e.g., 20 cm) distance and another at a far (e.g., 50 cm) distance. In another example, the mounting calibration may be performed live (e.g., online after deployment) using images of an object, one at a near distance and a second at a far distance. In another example, the mounting calibration may be performed periodically to maintain and/or update performance of the system 100.

In an example, the circuit 102 may be further configured to control an infrared (IR) or RGB-IR sensor 130 of the camera 106. In an example, the circuit 102 may be further configured to control the ISP circuit 108 for synchronization with the output of the camera 106. In various embodiments, the circuit 102 may be configured to generate one or more video output signals (e.g., VIDOUT) and a signal (e.g., DISPARITY MAP). In an example, the signal DISPARITY MAP may be used to determine depth information.

In various embodiments, the circuit 102 may be configured to perform a calibration process in accordance with an embodiment of the invention. In an example, the circuit 102 may be configured to generate a disparity angle map comprising disparity angle information for each pixel of an image captured by the camera 106. In various embodiments, the circuit 102 may be configured to perform an oriented block matching (OBM) algorithm that may cooperate with the calibration process. In an example, the OBM algorithm may build a disparity map by pattern shift matching using the disparity angle map generated during the calibration process. In some embodiments, the circuit 102 may be further configured to output the disparity angle map generated during calibration.

In various embodiments, video output signals VIDOUT generated by the processor 102 may encode a variety of video streams for different purposes. In one example, IR channel data without structured light pattern contamination and without additional IR illumination may be used for face detection, facial recognition, and/or live video feed in the day mode. In another example, IR channel data without structured light pattern contamination and with additional IR illumination may be used for face detection, facial recognition, and/or live video feed in a night mode. In still another example, IR channel data with the structured light pattern and without additional IR illumination may be used for depth analysis and liveness determination in both the day mode and the night mode. In embodiments utilizing an RGB-IR sensor, RGB channel data without structured light pattern contamination may be used for face detection and facial recognition and/or live video feed in a day mode. In an example, RGB channel data with structured light pattern contamination may discarded.

In some embodiments, the circuit 106 may be configured to present a signal (e.g., ES). The signal ES may indicate (or provide information facilitating calculation using a predefined formula of) when the sensor 130 begins exposure. In one example, a flash pin of a rolling shutter sensor 130 may be configured to generate the signal ES. In another example, other sensor signals from the circuit 106 may be used to calculate when the exposure starts (e.g., using a predefined formula, etc.). The signal ES from the circuit 106 may be utilized by the circuit 110 to control the circuit 104. In another example, the signal ES may be configured to generate an interrupt in response to the sensor 130 beginning exposure. The interrupt may cause the circuit 110 to start a predefined turn-on period of the structured light source 120 of the IR projector 104. In an example, the circuit 110 may be configured to program a timer with the predefined turn-on period. In response to receiving the signal ES, the circuit 110 may start the timer to turn on the structured light source for the predefined period of time.

In an example, the circuit 102 may have an input that may receive the signal ES, a first input/output that may communicate via a signal (e.g., ISP SYNC) with a first input/output of the circuit 108, a second input/output that may communicate an infrared image channel (e.g., IR DATA) with a second input/output of the circuit 108, an optional third input/output that may communicate a color image channel (e.g., RGB DATA) with a third input/output of the circuit 108, a first output that may present a signal (e.g., SL_TRIG), a second output that may present the one or more video output signals VIDOUT, and a third output that may present the signal DISPARITY MAP. In an example, the circuit 104 may have an input that may receive the signal SL_TRIG. The circuit 104 may be configured to generate a structured-light pattern based on the signal SL_TRIG.

In an example, the circuit 106 may have an output that may present the signal ES (or another signal communicating information that can be used to calculate the start of an exposure) and an input/output that may communicate a signal (e.g., RAW VIDEO) to a fourth input/output of the circuit 108. In an example, the signal RAW VIDEO may communicate a single channel (e.g., IR) of video pixel information to the circuit 108. In another example, the signal RAW VIDEO may communicate four channels (e.g., R, G, B, and IR) of video pixel information to the circuit 108. In an example, the circuits 106 and 108 may also exchange control and/or status signals via the connection carrying the signal RAW VIDEO.

In an example, the circuit 108 may be configured to split a four-channel RGB-IR video signal RAW VIDEO received from the circuit 106 into separate IR and RGB image data channels. In an embodiment using an RGB-IR image sensor, the circuit 108 may be configured to generate a first image channel with the signal IR DATA and a second image channel with the signal RGB DATA in response to the signal RAW VIDEO. The first image channel IR DATA generally comprises monochrome image data. The second image channel RGB DATA generally comprises color image data. In an example, the color image data may comprise RGB or YUV color space data. When the structured light pattern is projected by the circuit 104, the first image channel IR DATA generally comprises both IR image data and the structured light pattern projected by the circuit 104. When the structured light pattern is not projected by the circuit 104, the first image channel IR DATA generally comprises IR image data with no structured light pattern. When the structured light pattern is projected by the circuit 104, the second image channel RGB DATA generally comprises the structured light pattern projected by the circuit 104 also, and, therefore, is generally ignored.

In an example, the structured light pattern data carried by the first image channel IR DATA may be analyzed by the circuit 102 to obtain 3D (e.g., depth) information for the field of view of the camera 106. The circuit 102 may be further configured to make a liveness determination based upon the structured light pattern data carried by the first image channel IR DATA. In an example, the RGB (or YUV) data along with the IR data may be analyzed by the circuit 102 to discern (e.g., detect, identify, etc.) one or more features or objects in the field of view of the camera 106. In an example, the circuit 110 may be configured to generate the signal SL_TRIG. The circuit 110 may implement a structured light control timing protocol. In an example, the circuit 110 may be implemented in hardware, software (or firmware, microcoding, etc.), or a combination of hardware and software.

In an example, the circuit 120 may be implemented as a structured light source. In an example, the circuit 120 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern. The lens is generally configured to decompose the laser light pattern to a dense dot (or speckle) pattern array. In an example, the circuit 120 may implement a near infrared (NIR) light source. In various embodiments, the light source of the circuit 120 may be configured to emit light with a wavelength of approximately 940 nanometers (nm), which is not visible to the human eye. However, other wavelengths may be utilized. In an example, a wavelength in a range of approximately 800-1000 nm may be utilized. In an example, the circuit 120 may be configured to emit the structured light pattern in response to the signal SL_TRIG. In an example, a period and/or intensity of the light emitted by the circuit 120 may be controlled (e.g., programmed) by the circuit 102. In an example, the circuit 102 may configure the circuit 120 prior to asserting the signal SL_TRIG.

In an example, the circuit 130 may be implemented with either a global shutter or a rolling shutter image sensor. When the circuit 130 is implemented with a global shutter image sensor, all pixels of the sensor may start exposure simultaneously. When the circuit 130 is implemented with a rolling shutter image sensor, as each line (or row) of the sensor starts exposure, all pixels in the line (or row) may start exposure simultaneously. In an example, the circuit 130 may be implemented with either an infrared (IR) sensor or an RGB-IR image sensor. In an example, the RGB-IR image sensor may be implemented as an RGB-IR complementary metal oxide semiconductor (CMOS) image sensor.

In one example, the circuit 130 may be configured to assert the signal ES in response to starting an exposure. In another example, the circuit 130 may be configured to assert another signal that may be used to calculate the start of the exposure of the sensor using a predefined formula. In an example, the circuit 130 may be configured to generate the signal RAW VIDEO. In an example, the circuit 130 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. The red, green, and blue pixels may also receive (respond to) the longer infrared wavelengths due to hardware limitations. Hence, the infrared structured light pattern, when present, contaminates the RGB channel. Because of the structured light contamination, the RGB frames may be ignored generally when the infrared structured light pattern is present.

Figure 2:
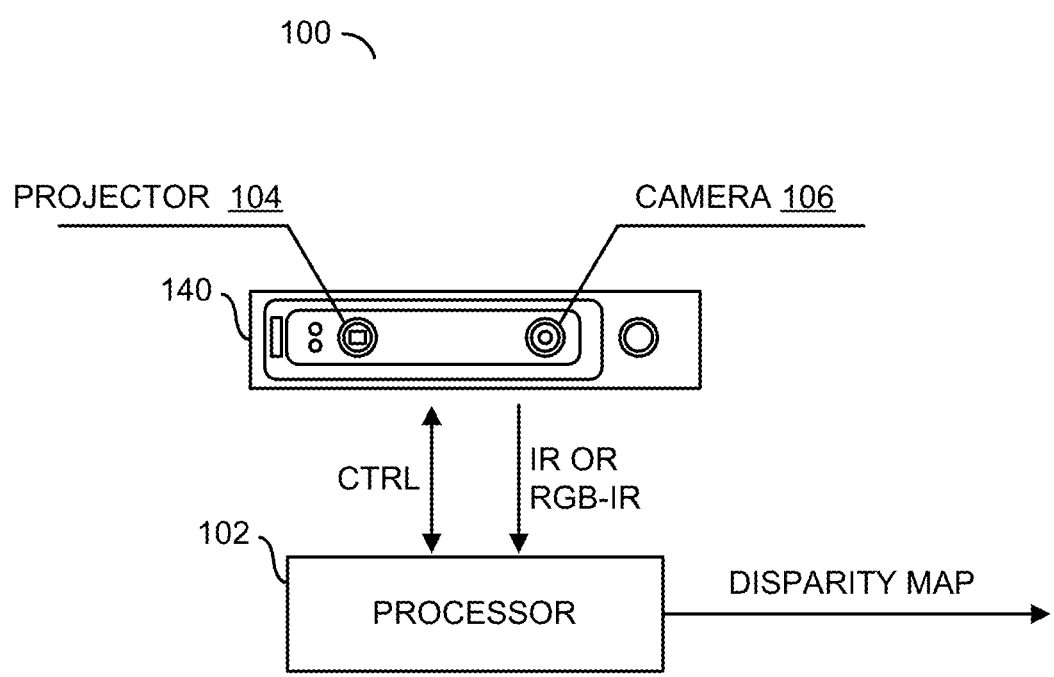
FIG. 2 is a diagram illustrating elements of a mono camera stereo system in accordance with an example embodiment of the invention.

Referring to FIG. 2, a diagram is shown illustrating elements of a mono camera stereo system in accordance with an example embodiment of the invention. In an example, the mono camera stereo system 100 may include a housing 140 and the processor 102. The infrared (IR) structured light projector 104, including a first lens and the structured light source 120, and the camera 106, including a second lens and the IR or RGB-IR image sensor of the circuit 130, may be mounted in the housing 140. In one example, the processor 102 may also be mounted within the housing 140. In another example, the processor 102 may be located externally or remotely to the housing 140. The IR structured light projector 104 may be configured, when turned on, to project a structured light pattern (SLP) on objects in the field of view of the camera 106. The IR image sensor of the circuit 130 may be used to acquire IR image data (with and without the structured light pattern) for the objects in the field of view of the camera 106. The RGB-IR image sensor, if implemented, of the circuit 130 may be used to acquire both IR image data (with and without the structured light pattern) and RGB image data (without the structured light pattern) for the objects in the field of view of the camera 106. The mono camera stereo system 100 generally provides advantages over conventional two camera 3D sensing systems. By utilizing an RGB-IR image sensor to obtain both RGB and IR image data with and without a structured light pattern (SLP), the mono camera stereo system 100 may reduce the system cost and the system complexity relative to conventional systems (e.g., one sensor and one lens versus two sensors and two lenses).

In an example, the processor 102 may utilize RGB-IR data from the RGB-IR sensor of the circuit 130 that has been separated (split) into a first image data channel comprising IR image data with the structured light pattern present and a second image data channel comprising RGB and/or IR image data without the structured light pattern present. In an example, the first and second image data channels may be processed by the processor 102 for 3D (e.g., depth) perception, liveness determination, 3D facial recognition, object detection, face detection, object identification, and facial recognition. In an example, the first image data channel having the IR image data with the structured light pattern present may be used to perform a structured light projector mounting calibration process in accordance with an example embodiment of the invention. The first image data channel having the IR image data with the structured light pattern present may also be used to perform depth analysis, liveness determination, and/or 3D facial recognition. In an example, the processor 102 may be configured to generate a disparity map output based on a disparity angle map generated during the projector mounting calibration. The second image data channel, having the IR image data without the structured light pattern present and the RGB image data without the structured light pattern present, may be used to generate an encoded (or compressed) video signal, bitstream, or multiple bitstreams, and to perform object detection, face detection, object identification, and/or facial recognition.

Figure 3:
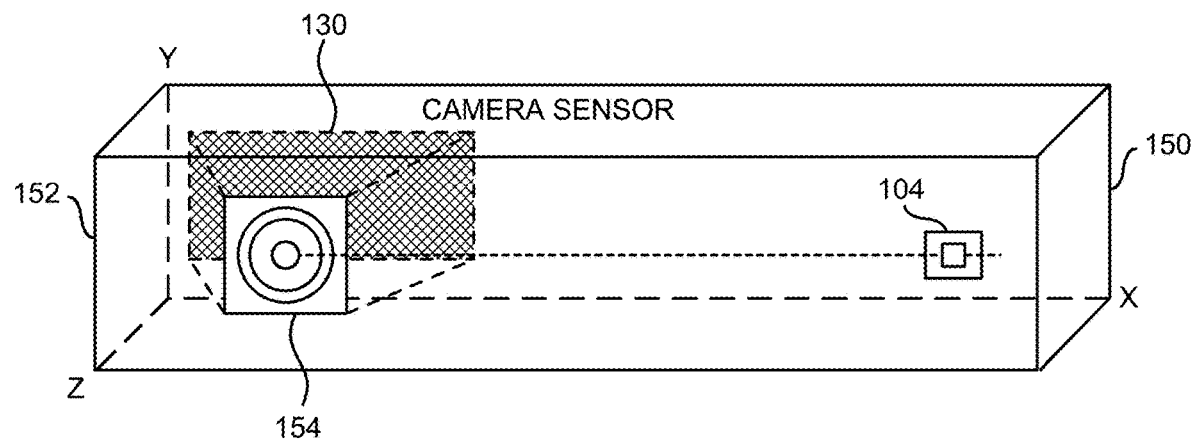
FIG. 3 is a diagram illustrating an example geometry of a mono camera stereo system.

Referring to FIG. 3, a schematic diagram is shown illustrating an example arrangement of elements of a mono camera stereo system. In various embodiments, a plane 150 of the camera sensor 130 is vertically separated from a plane 152 of a lens 154 of the camera 106. In the ideal mounting position, the center of the structured light projector 104 is restricted to being aligned horizontally (e.g., on an X-Axis) and vertically (e.g., on a Z-Axis) to an optical center of the lens 154 of the camera 106. Due to this restriction, the usage of a mono camera stereo system may be limited for the following reasons. In production, to ensure ideal alignment, high mounting accuracy of the structured light projector 104 is needed, which can increase production cost and reduce efficiency. In design, the high mounting accuracy criteria for the structured light projector 104 may restrict components distribution and raise size concerns. In various embodiments, a solution is generally provided that overcomes the mounting restriction and allows flexibility (e.g., lower accuracy) in mounting the structured light projector 104 in a mono camera stereo device.

Figure 4:
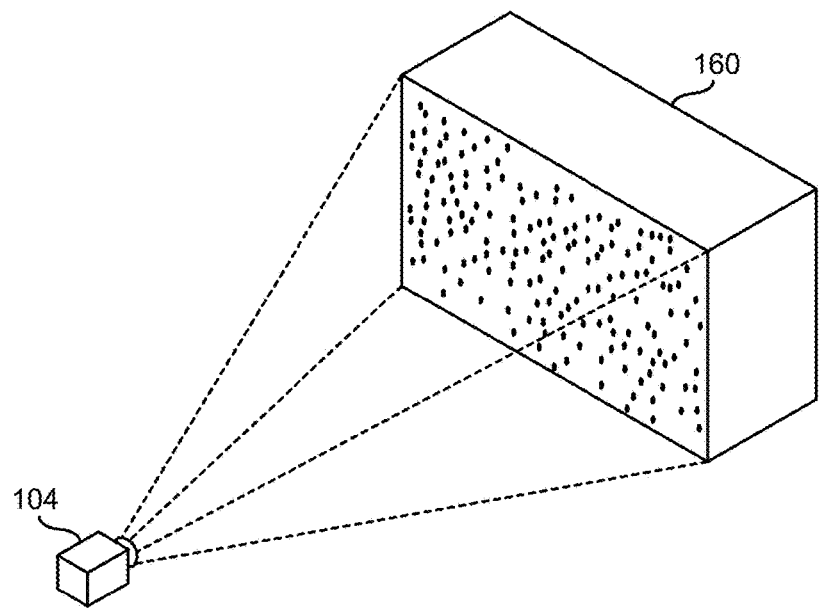
FIG. 4 is a diagram illustrating a structured light (or speckle) pattern projected on a wall by the structured light projector of FIG. 3.

Referring to FIG. 4, a diagram is shown illustrating a structured light (or speckle) pattern projected on an object by the structured light projector 104 of FIG. 3. In an example, the structured light projector 104 generates a dot light that scatters light, forming a dot or speckle pattern on an object (e.g., a wall, etc.) 160. The speckle pattern on the object 160 generally shifts horizontally when the object 160 moves toward the camera 106 or away from the camera 106. During a calibration process in accordance with embodiments of the invention, a reference image of the speckle pattern on the object 160 may be captured at a first (e.g., near) distance (R) and a target image of the speckle pattern on the object 160 may be captured at a second (e.g., far) distance (X). In an example, the distance of the reference image may be 20 centimeters (cm) and the distance of the target image may be 50 cm. Other near and/or far distances may be used accordingly. A moving distance (M) may be calculated by measuring the shift (e.g., M=X−R) of speckle pattern captured by the camera sensor 130. An angle of the shift of the speckle pattern between two captured images may also be determined. The angle of the shift offset of the speckle pattern may be referred to as a disparity angle.

Figure 5:
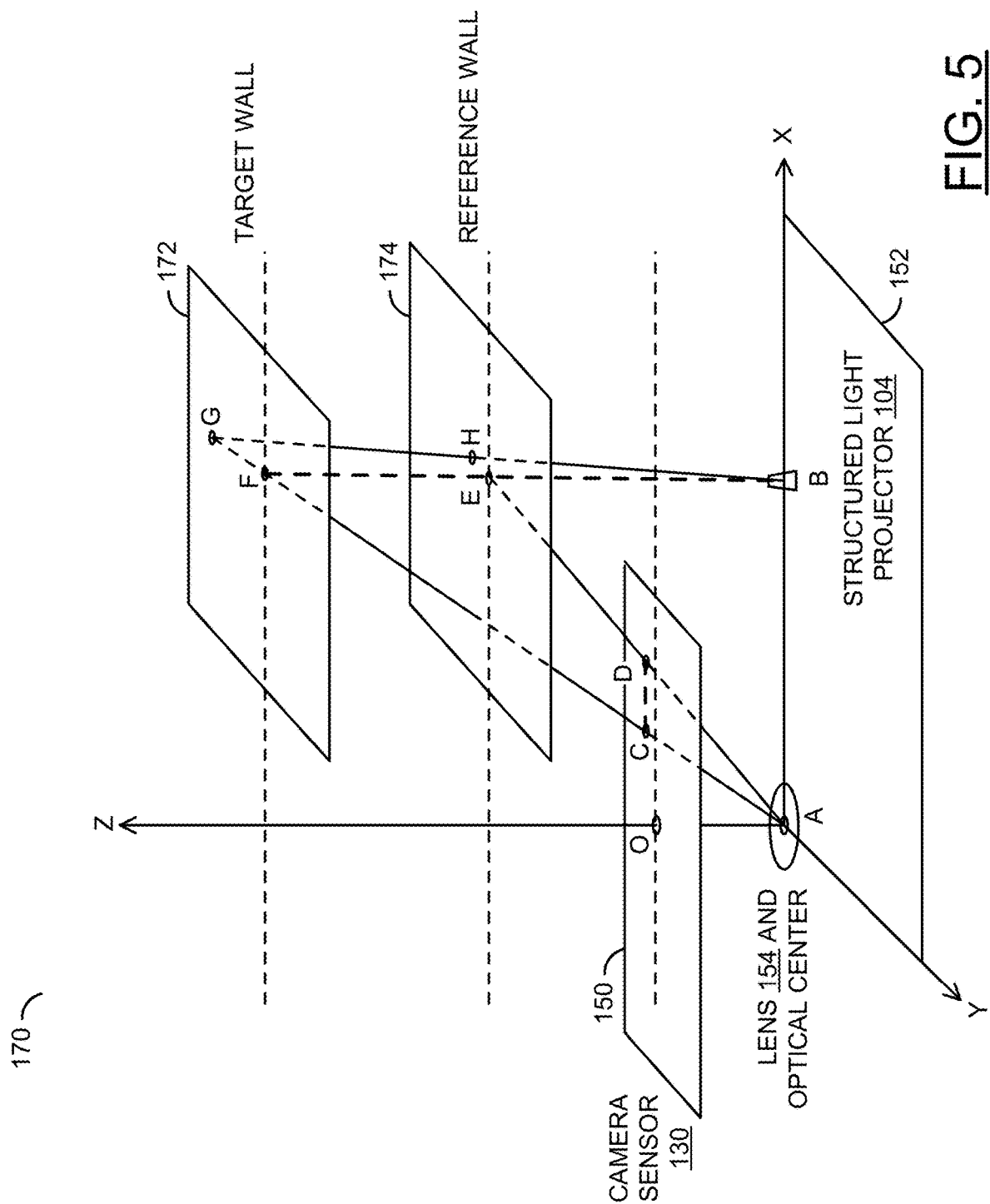
FIG. 5 is a diagram illustrating disparity determination for a mono camera stereo system using a well mounted structured light projector.

Referring to FIG. 5, a diagram 170 is shown illustrating disparity from the mono camera stereo system 100 with the structured light projector 104 well (accurately) mounted. In an example, the rectangular plane 150 of the camera sensor 130 may be parallel to an XY plane 152 containing the lens 154 of the camera 106 and the structured light projector 104, and a pixel row of the sensor 130 (e.g., represented by a dashed line) may be aligned with the X-axis direction. A point A may be used to represent the optical center of the lens 154, a point B may be used to represent the mounting point of the structured light projector 104. A point H and a point G may be used to represent one of the speckles on a target wall 172 and a reference wall 174, respectively, at different distances to the camera 106. The speckle G may be captured by the camera sensor 130 at a point C, and the speckle H may be captured by the camera sensor 130 at a point D. The disparity value is generally defined as the length of the line CD (e.g., the speckle pattern shift from D to C when the object moves from H to G).

A plane ABG is generally defined by the three points A, B, and G. The plane ABG intersects the plane 150 of the image sensor 130 at the disparity line CD and intersects the XY plane 152 at the X-axis. Because the plane ABG intersects the plane 150 of the image sensor 130 at the disparity line CD and intersects the XY plane 152 at the X-axis, the disparity line CD is always parallel to the X-axis. In existing disparity algorithms, such as Block Matching (BM) and Semi Global Block Matching (SGBM), the disparity line CD must remain aligned with the X-axis direction without any included angle with the X-axis. Hence, the existing disparity algorithms restrict the mounting of the structured light projector 104 relative to the camera 106.

Figure 6:
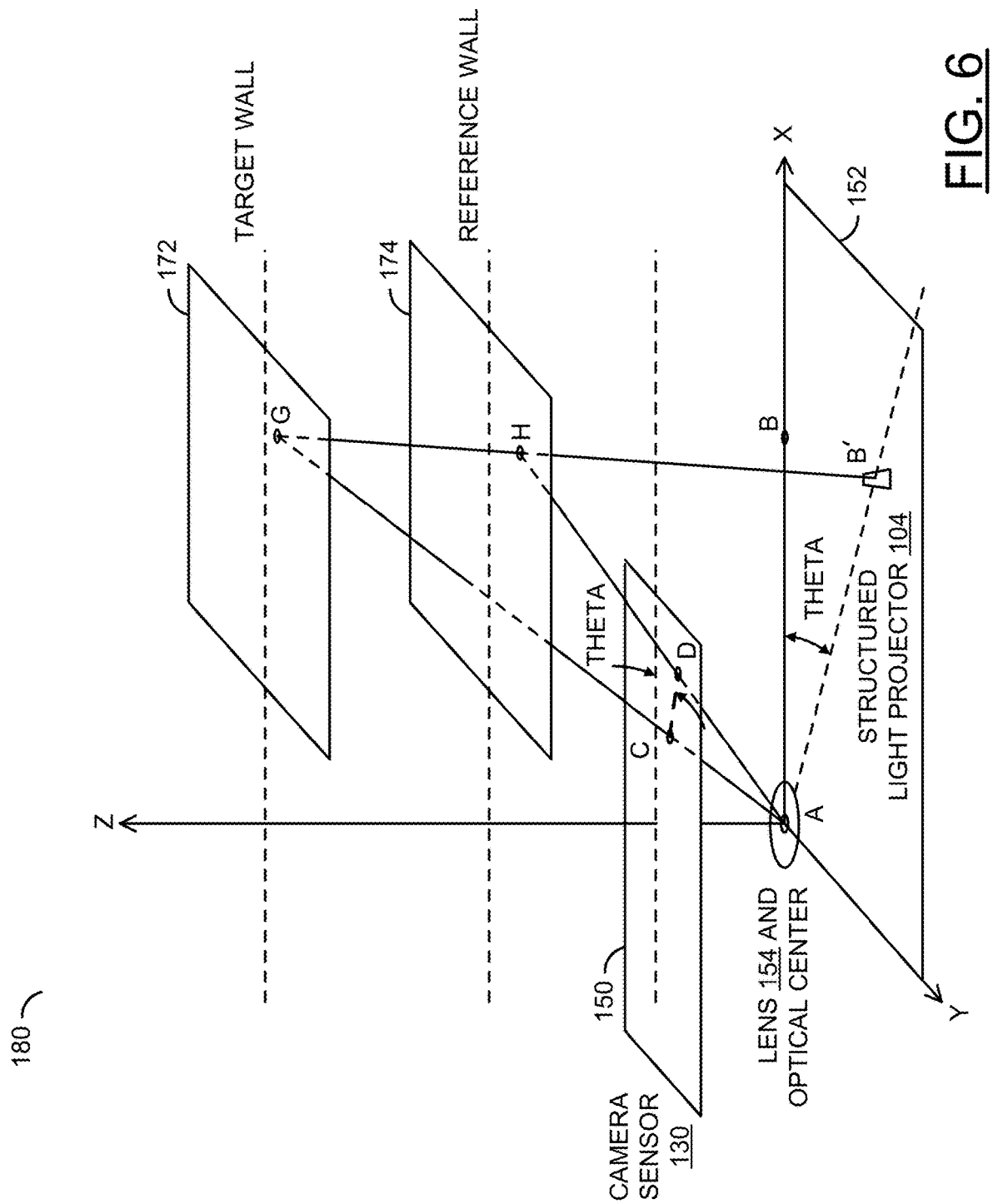
FIG. 6 is a diagram illustrating how a disparity determination for a mono camera stereo system changes when the structured light projector mounting deviates from an x-axis.

Referring to FIG. 6, a diagram 180 is shown illustrating the disparity from the mono camera stereo system 100 when the mounting of the structured light projector 104 is shifted in the XY plane 152. Given the same conditions as in FIG. 5, when the mounting point of the structured light projector 104 is shifted from the point B on the X-axis to a point (B') within the XY plane 152, an angle Theta appears between the line AB' and the X-axis. The plane AB'G intersects the plane 150 of the image sensor 130 at the disparity line CD and intersects the XY plane 152 at the line AB'. Since the disparity line CD is always parallel to the line AB', the disparity line CD also has the angle Theta with the pixel rows of the image sensor 130. In the example shown in FIG. 6 where the structured light projector 104 is shifted in the XY plane 152, all the pixels in the image sensor 130 generally have the same disparity angle Theta.

Figure 7:
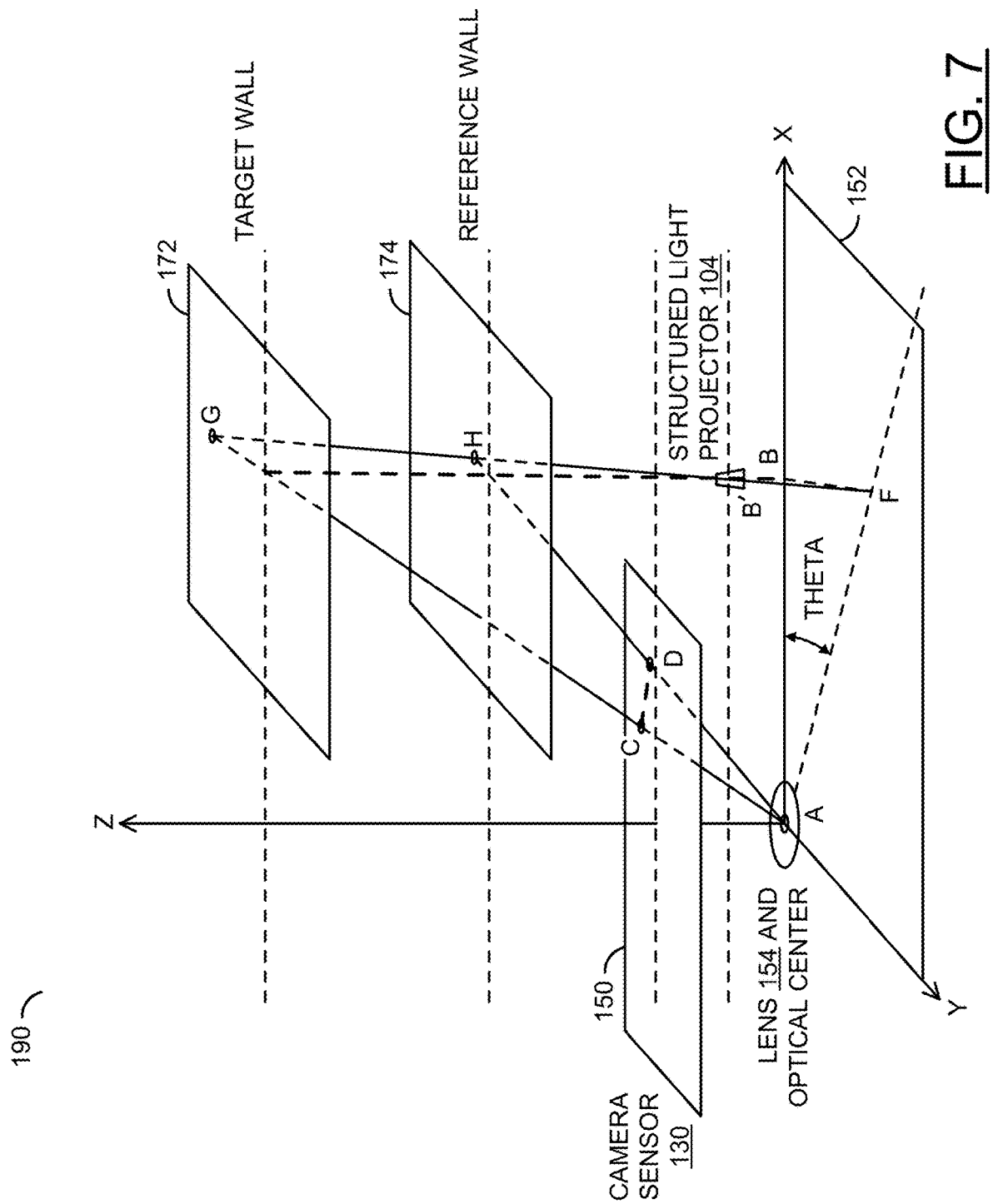
FIG. 7 is a diagram illustrating how a disparity determination for a mono camera stereo system changes when the structured light projector moves along a z-axis.

Referring to FIG. 7, a diagram 190 is shown illustrating the disparity from the mono camera stereo system 100 when the mounting of the structured light projector 104 is shifted along the Z-axis. Given the same conditions as in FIG. 6, except that there is an Up/Down shift of the structured light projector 104 from the point B to the B' along the Z-axis, the plane AB'G intersects the plane 150 of the image sensor 130 at the disparity line CD and intersects the XY plane 152 at a line AF. The angle Theta appears between the line AF and the X-axis. Because the disparity line CD is always parallel to the line AF, the disparity line CD also has an angle Theta with the pixel rows of the image sensor 130. In the example of FIG. 7 where the structured light projector 104 is shifted along the Z-axis, different pixels may have different disparity angles.

In general, the mounting point of the structured light projector 104 may shift not only as in FIG. 6, but also as in FIG. 7. Compared to the example in FIG. 5, the disparity angle generally presents as illustrated in both FIG. 6 and FIG. 7. When the shift in the mounting point of the structured light projector 104 is a combination of FIGS. 6 and 7, the speckle pattern generally shifts with a slope angle from D to C when the object 160 moves from point H to point G. For existing stereo algorithms, such as Block Matching (BM) and Semi Global Block Matching (SGBM) algorithms, the disparity angle should be strictly zero. When the disparity angle is not zero, the existing stereo algorithms cannot work normally, because the existing stereo algorithms can only perform the pattern matching by a horizontal shift in a row.

In an algorithm in accordance with an example embodiment of the invention, each pixel may be assigned a disparity angle (e.g., a disparity angle map). When each pixel is assigned a disparity angle, a new block matching scheme (e.g., an oriented BM or SGBM algorithm) may be defined that may guide pattern matching by a shift at the assigned disparity angle for each pixel. A calibration technique in accordance with example embodiments of the invention is generally configured to help build a map of the disparity angles for each of the pixels in an image captured by the image sensor 130. The new block matching scheme may utilize the disparity angle map to generate to generate a disparity map that is not dependent on an ideal mounting restriction.

Figure 8:
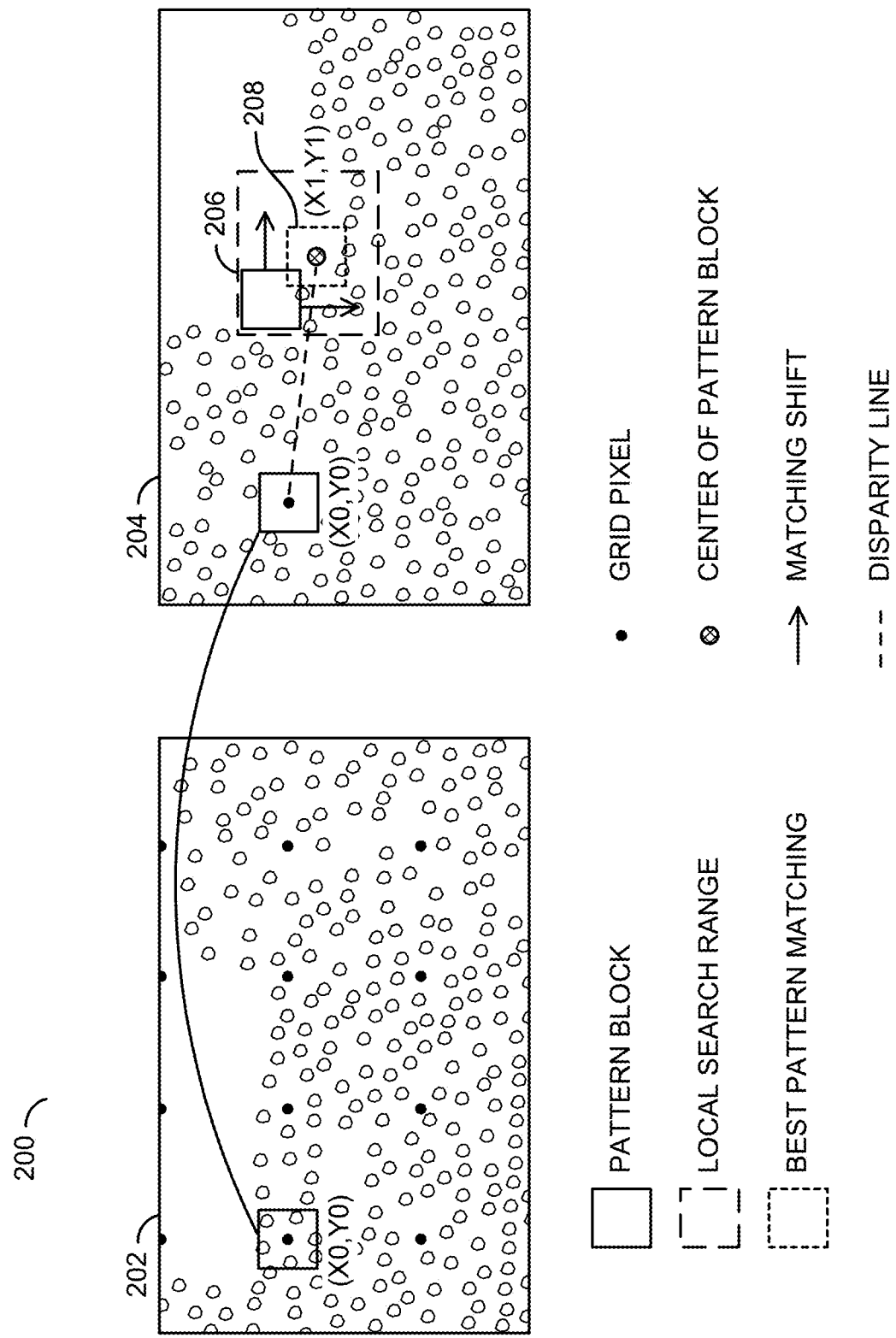
FIG. 8 is a diagram illustrating block matching in a local range.

Referring to FIG. 8, a diagram 200 is shown illustrating a block matching operation utilizing a local search range that may be part of a calibration process (or procedure) in accordance with an example embodiment of the invention. In various embodiments, a number of calibration steps may be performed to build a disparity angle map for the pixels of a captured image. In an example where the structured light projector 104 is flexibly (or less than ideally) mounted on a mono camera stereo device, the structured light projector 104 may be misaligned with the optical center of the camera lens 154 (e.g. with a shift offset in X/Y/Z axes as illustrated in FIGS. 6 and 7).

In a first step of the calibration process, the camera may be placed in front of a white wall, the structured light projector may be powered on, and two speckle pattern pictures, a first (e.g., a reference) picture 202 at a near distance (e.g., 20 cm) and a second (e.g., a target) picture 204 at a far distance (e.g., 50 cm), may be captured. In a next step of the calibration process, grid pixels (e.g., illustrated as black dots in FIG. 8) may be selected in the reference picture 202. The calibration process may continue by measuring the disparity angle for each grid pixel using the following sub-steps.

In a first sub-step, a local search range 206 (e.g., illustrated by a long-dash box outline in FIG. 8) may be estimated for the grid pixels in the target picture 204. In an example, a rectangular search range may be suggested. In a next sub-step, a pattern block may be cropped around a grid pixel in the reference picture 202. In an example, the pattern block may be cropped around the grid pixel located at (x0,y0) in the reference picture 202. In a next sub-step, the pattern block may be shifted over the pixels in the local search range 206 in the target picture 204, and a block matching operation may be performed to match the pattern block to the pixels in the local search range 206 to find a block 208 (e.g., located at (x1,y1) in the target picture 204) with the best pattern match (e.g., illustrated by a short-dash box outline in FIG. 8). In a next sub-step, a line may be determined that connects the dot located at coordinates (x0,y0) and the dot located at coordinates (x1,y1). The line connecting the two dots is the disparity line (e.g., illustrated by a dashed line in FIG. 8). In an example, the tangent of the disparity angle may be determined as (y1−y0)/(x1−x0). In an example, the disparity angle map may be generated as a two-dimensional (2D) vector by stuffing the tangent values computed for each grid pixel. The process is generally repeated for each of the grid pixels in the reference picture 202.

At this point there may still be some issues to resolve: (i) only the disparity angles of the grid pixels have been obtained, not the complete map of pixels; (ii) the disparity angle of some of the grid pixels may not have been obtained due to very low matching confidence even though the match criteria is best matching; (iii) wrong measurements of the disparity angle may have been obtained due to some mismatching. In a next step of the calibration process, the wrong disparity angles may be corrected and a complete (dense) disparity angle map may be generated. In a first sub-step, the matrix of the disparity angle map may be treated as a parametric surface. In an example, a surface formulation for the parametric surface may be expressed using the following Equation 1:

$$z = ax^3 + bx^2y + cxy^2 + dy^3 + ex^2 + fxy + gy^2 + hx + my + n, \quad \text{EQ. 1}$$

where z is the tangent value of disparity angle and (x,y) is the pixel coordinates in the sensor plane 150. When the ten coefficients a, b, c, d, e, f, g, h, m, and n are determined, the surface is generally determined (fixed) for the map.

Based on the measurements of the grid pixels, a best fit surface may be easily obtained using a regression method. In an example, a least square regression (LSR) method may be utilized. In an example with N measurement pairs $(x_i, y_i) \rightarrow z_i$, where $(x_i, y_i)$ is the axis of the grid pixel, and $z_i$ is the tangent value of the grid pixel, the coefficients a, b, c, d, . . . , m, and n may be calculated by resolving the following formulation:

$$\begin{pmatrix} x0^{\wedge}3 & (x0^{\wedge}2)y0 & y0^{\wedge}2)x0 & y0^{\wedge}3 & x0^{\wedge}2 & x0y0 & y0^{\wedge}2 & x0 & y0 & 1 \\ x1^{\wedge}3 & (x1^{\wedge}2)y1 & y1^{\wedge}2)x1 & y1^{\wedge}3 & x1^{\wedge}2 & x1y1 & y1^{\wedge}2 & x1 & y1 & 1 \\ x2^{\wedge}3 & (x2^{\wedge}2)y2 & y2^{\wedge}2)x2 & y2^{\wedge}3 & x2^{\wedge}2 & x2y2 & y2^{\wedge}2 & x2 & y2 & 1 \\ \vdots & & & & & & & & & \vdots \\ xN^{\wedge}3 & (xN^{\wedge}2)yN & yN^{\wedge}2)xN & yN^{\wedge}3 & xN^{\wedge}2 & xNyN & yN^{\wedge}2 & xN & yN & 1 \end{pmatrix} \times \begin{pmatrix} a \\ b \\ c \\ d \\ e \\ f \\ g \\ h \\ m \\ n \end{pmatrix} = \begin{pmatrix} z0 \\ z1 \\ z2 \\ \vdots \\ zN \end{pmatrix}$$

When the coefficients have been calculated, the surface formulation is fixed. The resolved formulation may be used to predict an updated disparity angle map for all grid pixels. The updated disparity angle map for all grid pixels generally includes correction of any wrong disparity lines and any missing disparity lines. In a second sub-step, the disparity angles for non-grid pixels may be predicted using the following formulation:

$$(xi^{\wedge}3 \quad xi^{\wedge}2yi \quad yi^{\wedge}2xi \quad yi^{\wedge}3 \quad xi^{\wedge}2 \quad xiyi \quad yi^{\wedge}2 \quad xi \quad yi \quad 1) \times \begin{pmatrix} a \\ b \\ c \\ d \\ e \\ f \\ g \\ h \\ m \\ n \end{pmatrix} = (zi)$$

When the disparity angles for the non-grid pixels have been predicted, a complete map of disparity angle has been obtained.

After the calibration process has been performed, the map of the disparity angle is complete and ready to use. In an example, the typical block matching (BM) algorithm may be modified in accordance with an embodiment of the invention to obtain an Oriented Block Matching (OBM) process that can cooperate with the calibration process in accordance with an embodiment of the invention. The OBM process may be similar to the typical BM algorithm, except that the typical BM process builds disparity by pattern shift matching in a horizontal row, while the OBM process builds disparity by pattern shift matching using the disparity angles in the map of disparity angle generated during the calibration process.

In an example, the calibration process may utilize a cubic parametric surface described above by the Equation 2:

$$z = ax^3 + bx^2y + cxy^2 + dy^3 + ex^2 + fxy + gy^2 + hx + my + n. \quad \text{EQ. 2}$$

However, the calibration process is not limited to using a cubic parametric surface. Other orders of parametric surfaces may be used to meet design criteria of a particular implementation. In addition, the regression of the parametric surface is not limited to the LSR regression method. Other regression algorithms may be implemented accordingly to meet design criteria of a particular implementation. In various embodiments, the disparity angle map may be built using the calibration process described above and applied to a modified block matching algorithm (e.g., the oriented block matching (OBM) algorithm described above). However, a disparity angle map in accordance with embodiments of the invention may be applied to modify other stereo algorithms (e.g., SGBM, etc.). In an example, an offline calibration process has been described using the capture of two wall pictures, one at a near distance and one at a far distance. However, the calibration process in accordance with embodiments of the invention may also be utilized to perform online calibration by capturing two pictures of an object, one when the object is at a near distance and one when the object is at a far distance.

Figure 9:
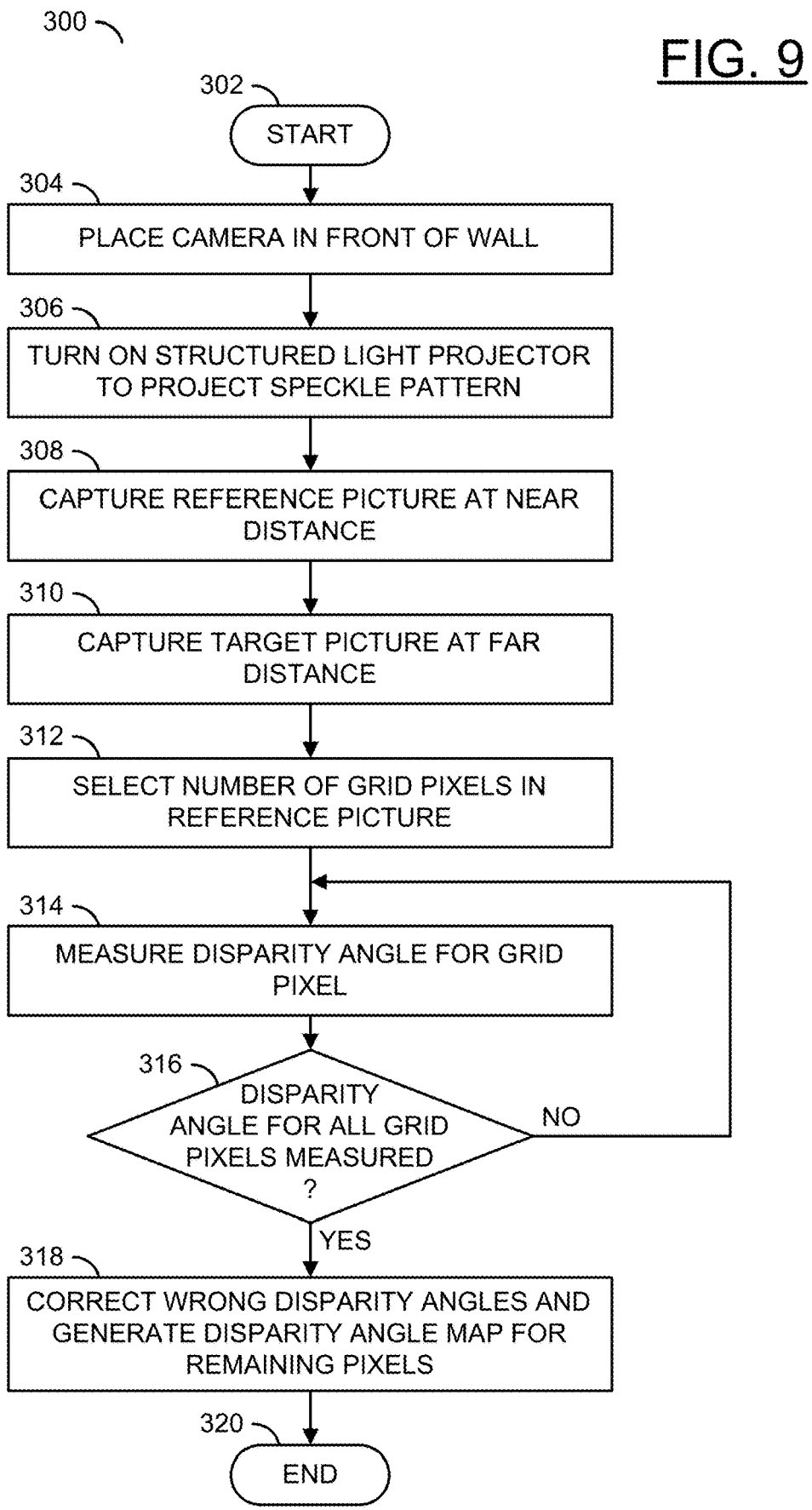
FIG. 9 is a flow diagram illustrating a calibration process in accordance with another example embodiment of the invention.

Referring to FIG. 9, a flow diagram of a process 300 is shown. The process (or method) 300 may perform a mounting calibration process in accordance with another example embodiment of the invention. The process 300 generally comprises a step (or state) 302, a step (or state) 304, a step (or state) 306, a step (or state) 308, a step (or state) 310, a step (or state) 312, a step (or state) 314, a decision step (or state) 316, a step (or state) 318, and a step (or state) 320. The process 300 generally begins in the step 302 and moves to the step 304. In the step 304, the camera 106 may be placed in front of a white wall. In the step 306, the structured light projector 104 may be powered on. In the step 308, a first (e.g., a reference) picture 202 of a speckle pattern projected on the wall by the structured light projector 104 is captured at a near distance (e.g., 20 cm). In the step 310, a second (e.g., a target) picture 204 of the speckle pattern projected on the wall is captured at a far distance (e.g., 50 cm). In the step 312, a grid pixel in the reference picture 202 may be selected. In the step 314, the disparity angle for the selected grid pixel may be measured. In the step 316, the process 300 checks whether disparity angles have been measured for all of the grid pixels. If disparity angles for all of the grid pixels have not been measured, the process 300 returns to the step 314 to process the next grid pixel. When disparity angles for all of the grid pixels have been measured, the process 300 moves to the step 318.

At this point there may still be some issues to resolve: only the disparity angles of the grid pixels have been obtained, not the complete map of pixels; the disparity angle of some of the grid pixels may not have been obtained due to very low matching confidence even though the match criteria is best matching; wrong measurements of the disparity angle may be obtained due to some mismatching. In the step 318, process 300 corrects wrong disparity angles and generates a complete (dense) disparity angle map for the non-grid pixels. When the complete (dense) disparity angle map has been generated, the process 300 moves to the step 320 and terminates.

Figure 10:
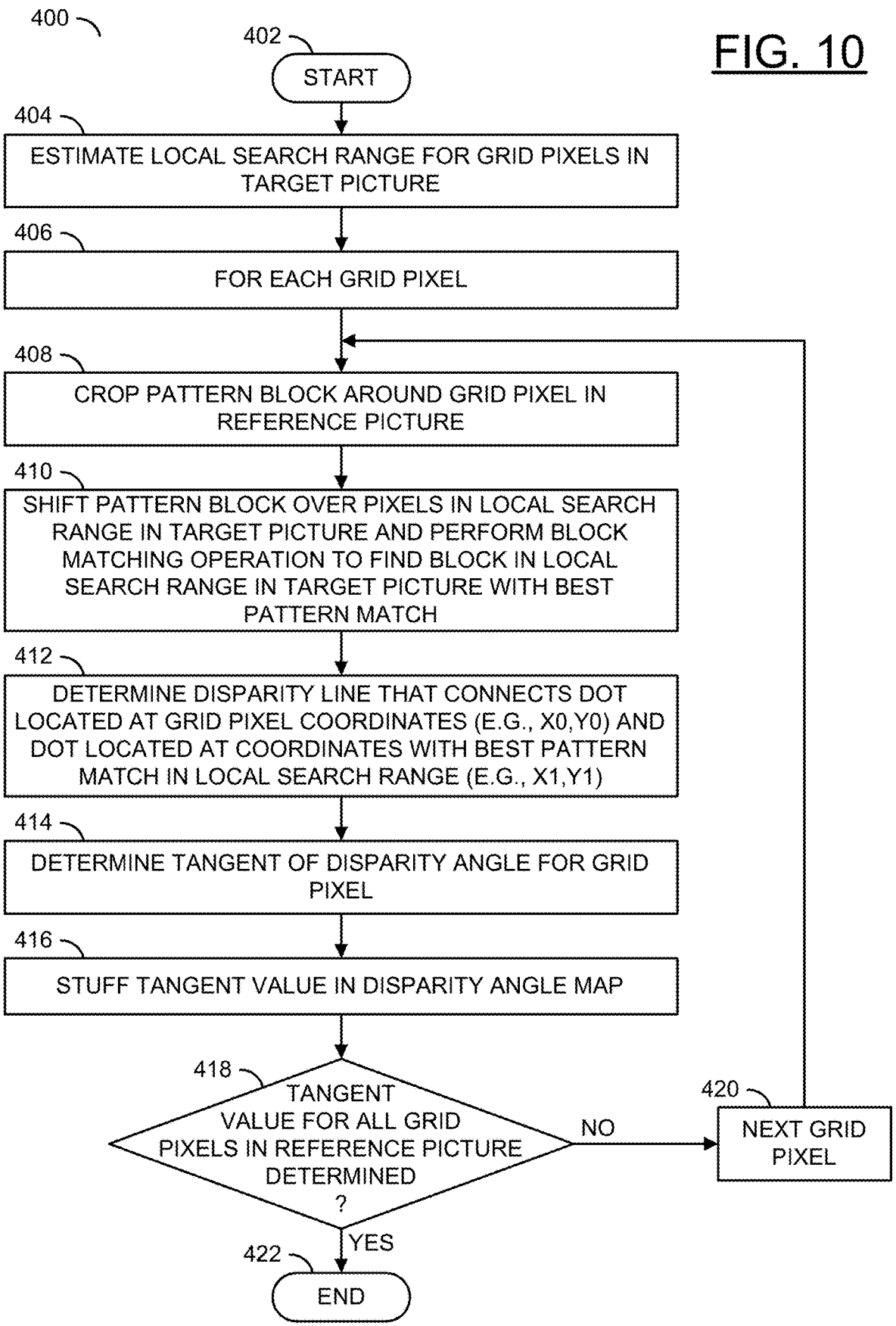
FIG. 10 is a flow diagram illustrating a process for measuring disparity angles for grid pixels.

Referring to FIG. 10, a flow diagram of a process 400 is shown. The process (or method) 400 generally illustrates a process for measuring disparity angles for grid pixels in accordance with another example embodiment of the invention. The process 400 generally comprises a step (or state) 402, a step (or state) 404, a step (or state) 406, a step (or state) 408, a step (or state) 410, a step (or state) 412, a step (or state) 414, a step (or state) 416, a decision step (or state) 418, a step (or state) 420, and a step (or state) 422. The process 400 may start in the step 402 and move to the step 404.

In the step 404, a local search range 206 (e.g., illustrated by a long-dash box outline in FIG. 8) may be estimated for the grid pixels in the target picture 204. In an example, a rectangular search range may be suggested. In the step 406, the process 400 may begin determining disparity angels for each of the grid pixels in the target picture 204. In the step 408, the process 400 may crop a pattern block around a grid pixel in the reference picture 202. In an example, the pattern block may be cropped around the grid pixel located at (x0,y0) in the reference picture 202. In the step 410, the process 400 may shift the pattern block over the pixels in the local search range 206 in the target picture 204, and perform a block matching operation to match the pattern block to the pixels in the local search range 206 to find a block 208 (e.g., located at (x1,y1) in the target picture 204) with the best pattern match. In the step 412, the process 400 may determine a line connecting the dot located at coordinates (x0,y0) and the dot located at coordinates (x1,y1). The line connecting the two dots is the disparity line. In the step 414, the process 400 may determine the tangent of the disparity angle may as (y1−y0)/(x1−x0). In the step 416, the process 400 may stuff the tangent value computed for the grid pixel into a two-dimensional (2D) vector representing the disparity angle map for the grid pixels. In the step 418, the process 400 checks to determine whether tangent values have been calculated for all the grid pixels in the reference picture. When tangent values have not been calculated for all the grid pixels in the reference picture, the process 400 moves to the step 420 to select the next grid pixel, then returns to the step 408. When tangent values have been calculated for all the grid pixels in the reference picture, the process 400 moves to the step 422 and terminates.

Figure 11:
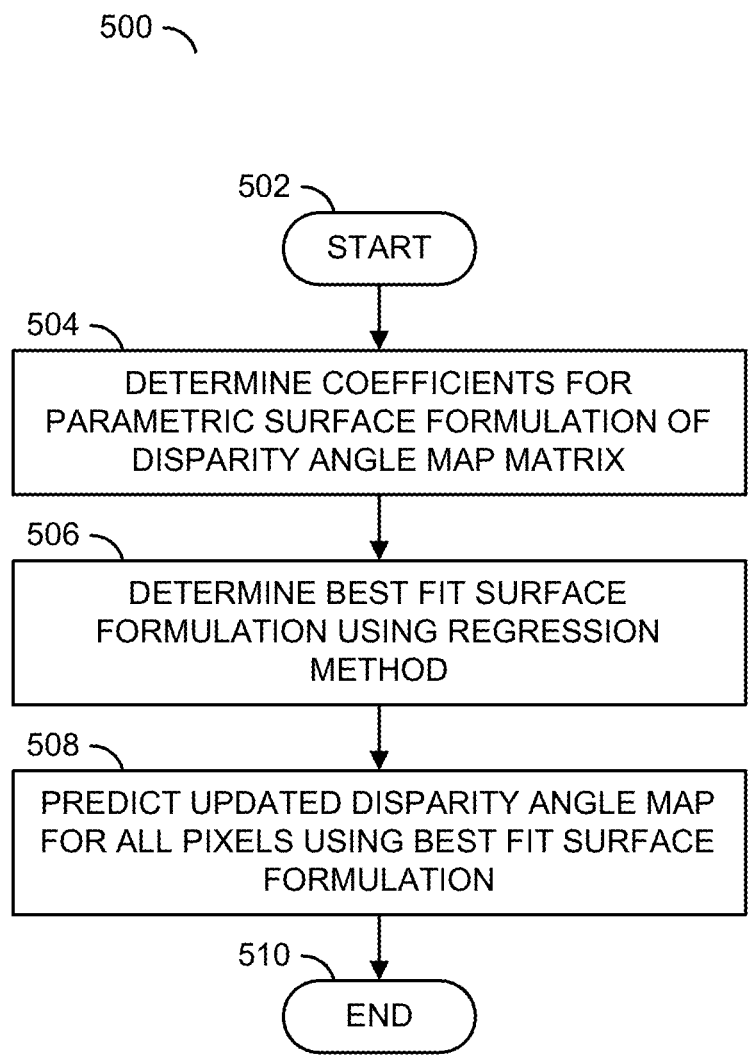
FIG. 11 is a flow diagram illustrating a process for generating a disparity angle map for all pixels in a target image.

Referring to FIG. 11, a flow diagram of a process 500 is shown. The process (or method) 500 generally illustrates a process for generating a disparity angle map for all pixels in a target image in accordance with an example embodiment of the invention. The process 500 generally comprises a step (or state) 502, a step (or state) 504, a step (or state) 506, a step (or state) 508, and a step (or state) 510. The process 500 may begin the step 502 and move to the step 504. In the step 504, the process 500 may determine coefficients for a parametric surface formulation of the disparity angle map matrix. In an example, the disparity angle map matrix may be treated as a parametric surface. In an example, a surface formulation for the parametric surface may be expressed using the following Equation 1:

$$z = ax^3 + bx^2y + cxy^2 + dy^3 + ex^2 + fxy + gy^2 + hx + my + n,\qquad \text{EQ. 1}$$

where z is the tangent value of disparity angle and (x,y) is the pixel coordinates in the sensor plane 150. When the ten coefficients a, b, c, d, e, f, g, h, m, and n are determined, the surface is generally determined (fixed) for the disparity angle map.

In the step 506, the process 500 may determine a best fit surface formulation using a regression method. Based on the measurements of the grid pixels, a best fit surface may be easily obtained using a regression method, such as least square regression (LSR). In an example with N measurement pairs $(x_i, y_i) \rightarrow z_i$, where $(x_i, y_i)$ is the axis of the grid pixel, and $z_i$ is the tangent value of the grid pixel, the coefficients a, b, c, d, . . . , m, and n may be calculated by resolving the following formulation:

$$\begin{pmatrix} x0^3 & (x0^2)y0 & y0^2)x0 & y0^3 & x0^2 & x0y0 & y0^2 & x0 & y0 & 1 \\ x1^3 & (x1^2)y1 & y1^2)x1 & y1^3 & x1^2 & x1y1 & y1^2 & x1 & y1 & 1 \\ x2^3 & (x2^2)y2 & y2^2)x2 & y2^3 & x2^2 & x2y2 & y2^2 & x2 & y2 & 1 \\ \vdots & & & & & & & & & \vdots \\ xN^3 & (xN^2)yN & yN^2)xN & yN^3 & xN^2 & xNyN & yN^2 & xN & yN & 1 \end{pmatrix} \times \begin{pmatrix} a \\ b \\ c \\ d \\ e \\ f \\ g \\ h \\ m \\ n \end{pmatrix} = \begin{pmatrix} z0 \\ z1 \\ z2 \\ \vdots \\ zN \end{pmatrix}$$

When the coefficients have been calculated, the surface formulation is fixed. The resolved formulation may be used to predict an updated disparity angle map for all of the grid pixels. The updated disparity angle map for all grid pixels includes correction of any wrong disparity lines and any missing disparity lines. When the updated disparity angle map for all of the grid pixels has been predicted, the process 500 may move to the step 508. In the step 508, the process 500 may predict an updated disparity angle map for all pixels of an image using the best fit surface formulation determined in the step 506. In an example, the disparity angles for the non-grid pixels may be predicted by the following formulation:

$$(xi^3 \ xi^2yi \ yi^2xi \ yi^3 \ xi^2 \ xiyi \ yi^2 \ xi \ yi \ 1) \times \begin{pmatrix} a \\ b \\ c \\ d \\ e \\ f \\ g \\ h \\ m \\ n \end{pmatrix} = (zi)$$

When the disparity angles for the non-grid pixels have been predicted, a complete map of disparity angle has been obtained. The process 500 may then move to the step 510 and terminate.

Figure 12:
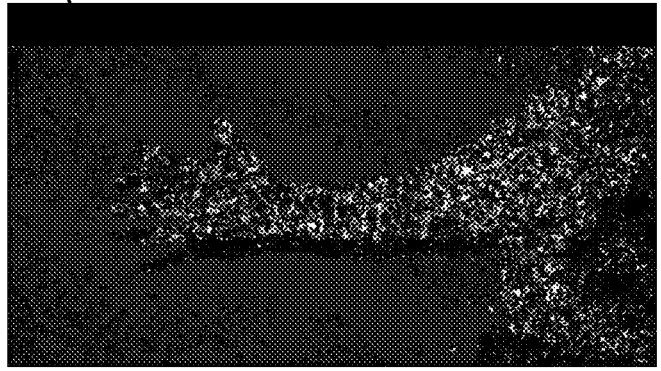
FIG. 12 is a diagram illustrating results between performing a typical block matching routine of performing an oriented block matching routine in accordance with an example embodiment of the invention.
Figure 12:
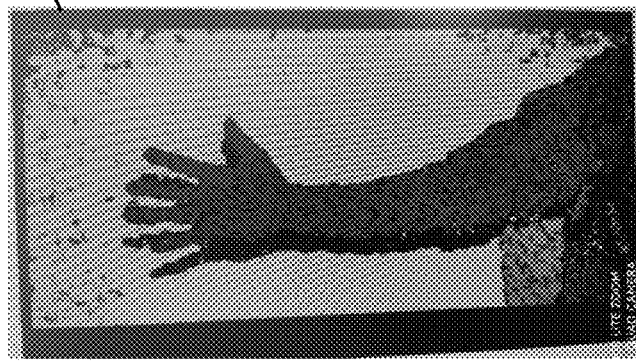

Referring to FIG. 12, a diagram 600 is shown illustrating example results between performing a typical block matching routine and performing an oriented block matching routine in accordance with an example embodiment of the invention. In an example, a picture 602 generally illustrates a result of running a typical block matching algorithm without calibration of the disparity angle when the structured light projector 104 is not accurately mounted in a mono camera stereo system. A lot of noise is present in the result of the typical block matching algorithm without calibration of the disparity angle. A picture 604 generally illustrates an improved result of running an oriented block matching algorithm in accordance with an example embodiment of the invention in cooperation with calibration of the disparity angle in accordance with an example embodiment of the invention when the structured light projector 104 is not accurately mounted in the mono camera stereo system.

Figure 13:
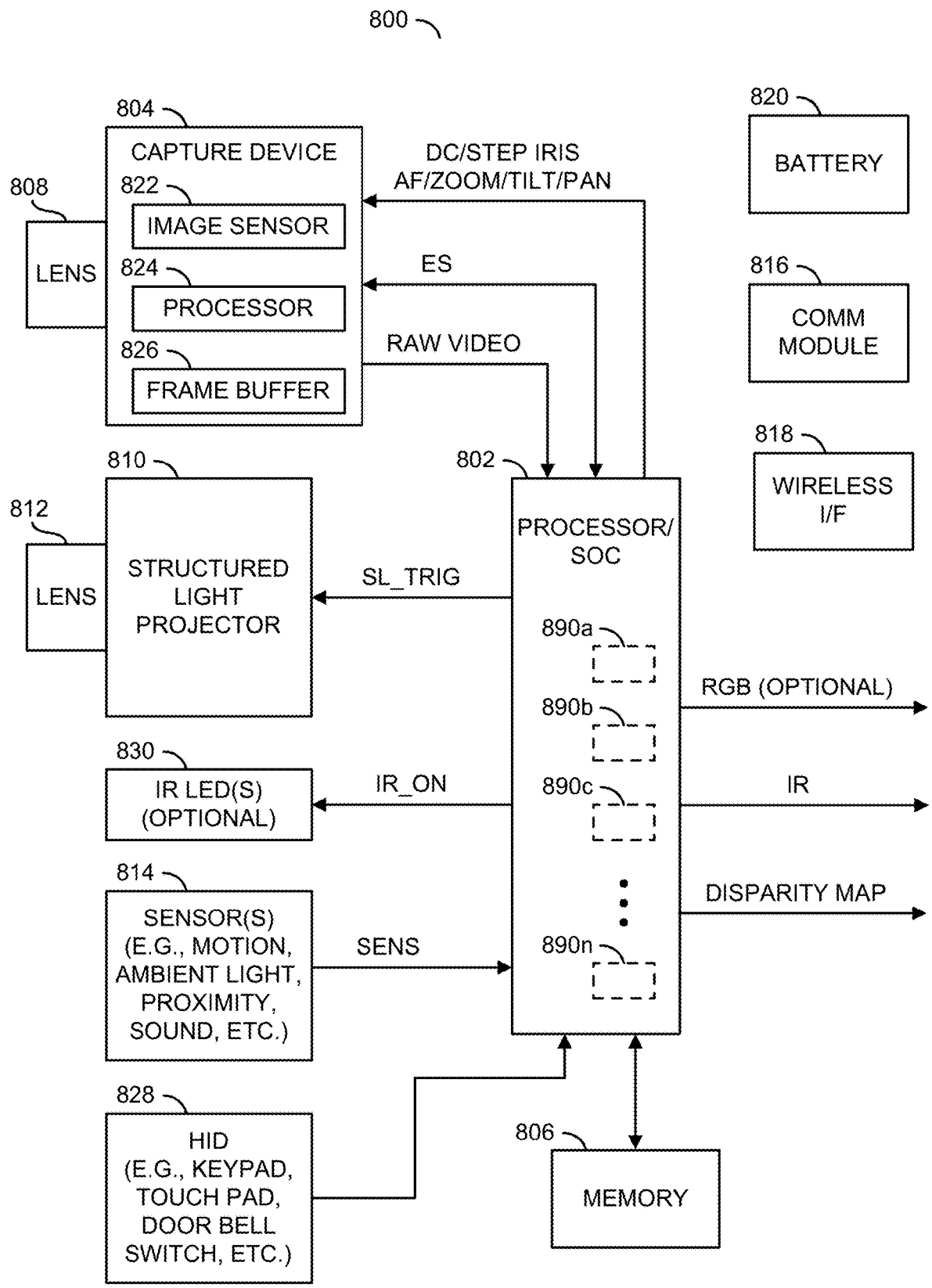
FIG. 13 is a diagram illustrating an apparatus in accordance with another example embodiment of the invention.

Referring to FIG. 13, a block diagram is shown illustrating an example implementation of a mono camera stereo device 800. In an example, the mono camera stereo device 800 may comprise a block (or circuit) 802, a block (or circuit) 804, a block (or circuit) 806, a block (or circuit) 808, a block (or circuit) 810, a block (or circuit) 812, a block (or circuit) 814, a block (or circuit) 816, a block (or circuit) 818, and/or a block (or circuit) 820. The circuit 802 may be implemented as a processor and/or System on Chip (SoC). The circuit 804 may be implemented as a capture device. The circuit 806 may be implemented as a memory. The block 808 may be implemented as an optical lens. The circuit 810 may be implemented as a structured light projector. The block 812 may be implemented as a structured light pattern lens. The circuit 814 may be implemented as one or more sensors (e.g., motion, ambient light, proximity, sound, etc.). The circuit 816 may be implemented as a communication device. The circuit 818 may be implemented as a wireless interface. The circuit 820 may be implemented as a battery 820.

In some embodiments, the mono camera stereo device 800 may comprise the processor/SoC 802, the capture device 804, the memory 806, the lens 808, the IR structured light projector 810, the lens 812, the sensors 814, the communication module 816, the wireless interface 818, and the battery 820. In another example, the mono camera stereo device 800 may comprise the capture device 804, the lens 808, the IR structured light projector 810, the lens 812, and the sensors 814, and the processor/SoC 802, the memory 806, the communication module 816, the wireless interface 818, and the battery 820 may be components of a separate device. The implementation of the mono camera stereo device 800 may be varied according to the design criteria of a particular implementation.

The lens 808 may be attached to the capture device 804. In an example, the capture device 804 may comprise a block (or circuit) 822, a block (or circuit) 824, and a block (or circuit) 826. The circuit 822 may implement an image sensor. In an example, the image sensor of the circuit 822 may be an IR image sensor or an RGB-IR image sensor. The circuit 824 may be a processor and/or logic. The circuit 826 may be a memory circuit (e.g., a frame buffer).

The capture device 804 may be configured to capture video image data (e.g., light collected and focused by the lens 808). The capture device 804 may capture data received through the lens 808 to generate a video bitstream (e.g., a sequence of video frames). In various embodiments, the lens 808 may be implemented as a fixed focus lens. A fixed focus lens generally facilitates smaller size and low power. In an example, a fixed focus lens may be used in battery powered, doorbell, and other low power camera applications. In some embodiments, the lens 808 may be directed, tilted, panned, zoomed and/or rotated to capture the environment surrounding the mono camera stereo device 800 (e.g., capture data from the field of view). In an example, professional camera models may be implemented with an active lens system for enhanced functionality, remote control, etc.

The capture device 804 may transform the received light into a digital data stream. In some embodiments, the capture device 804 may perform an analog to digital conversion. For example, the image sensor 822 may perform a photoelectric conversion of the light received by the lens 808. The processor/logic 824 may transform the digital data stream into a video data stream (or bitstream), a video file, and/or a number of video frames. In an example, the capture device 804 may present the video data as a digital video signal (e.g., RAW VIDEO). The digital video signal may comprise the video frames (e.g., sequential digital images and/or audio).

The video data captured by the capture device 804 may be represented as a signal/bitstream/data communicated by the digital video signal RAW VIDEO. The capture device 804 may present the signal RAW VIDEO to the processor/SoC 802. The signal RAW VIDEO may represent the video frames/video data. The signal RAW VIDEO may be a video stream captured by the capture device 804.

The image sensor 822 may receive light from the lens 808 and transform the light into digital data (e.g., the bitstream). For example, the image sensor 822 may perform a photo-electric conversion of the light from the lens 808. In some embodiments, the image sensor 822 may have extra margins that are not used as part of the image output. In some embodiments, the image sensor 822 may not have extra margins. In various embodiments, the image sensor 822 may be configured to generate an RGB-IR video signal. In an infrared light only illuminated field of view, the image sensor 822 may generate a monochrome (B/W) video signal. In a field of view illuminated by both IR light and visible light, the image sensor 822 may be configured to generate color information in addition to the monochrome video signal. In various embodiments, the image sensor 822 may be configured to generate a video signal in response to visible and/or infrared (IR) light.

The processor/logic 824 may transform the bitstream into a human viewable content (e.g., video data that may be understandable to an average person regardless of image quality, such as the video frames). For example, the processor/logic 824 may receive pure (e.g., raw) data from the image sensor 822 and generate (e.g., encode) video data (e.g., the bitstream) based on the raw data. The capture device 804 may have the memory 826 to store the raw data and/or the processed bitstream. For example, the capture device 804 may implement the frame memory and/or buffer 826 to store (e.g., provide temporary storage and/or cache) one or more of the video frames (e.g., the digital video signal). In some embodiments, the processor/logic 824 may perform analysis and/or correction on the video frames stored in the memory/buffer 826 of the capture device 804.

The sensors 814 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 814 may be configured to detect motion anywhere in the field of view monitored by the mono camera stereo device 800. In various embodiments, the detection of motion may be used as one threshold for activating the capture device 804. The sensors 814 may be implemented as an internal component of the mono camera stereo device 800 and/or as a component external to the mono camera stereo device 800. In an example, the sensors 814 may be implemented as a passive infrared (PIR) sensor. In another example, the sensors 814 may be implemented as a smart motion sensor. In embodiments implementing the smart motion sensor, the sensors 814 may comprise a low resolution image sensor configured to detect motion and/or persons.

In various embodiments, the sensors 814 may generate a signal (e.g., SENS). The signal SENS may comprise a variety of data (or information) collected by the sensors 814. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 802. In an example, the sensors 814 may generate (assert) the signal SENS when motion is detected in the field of view monitored by the mono camera stereo device 800. In another example, the sensors 814 may generate (assert) the signal SENS when triggered by audio in the field of view monitored by the mono camera stereo device 800. In still another example, the sensors 814 may be configured to provide directional information with respect to motion and/or sound detected in the field of view. The directional information may also be communicated to the processor/SoC 802 via the signal SENS.

The processor/SoC 802 may be configured to execute computer readable code and/or process information. In various embodiments, the computer readable code may be stored within the processor/SoC 802 (e.g., microcode, etc.) and/or in the memory 806. In an example, the processor/SoC 802 may be configured to execute one or more artificial neural network models (e.g., facial recognition CNN, object detection CNN, object classification CNN, etc.) stored in the memory 806. In an example, the memory 806 may store one or more directed acyclic graphs (DAGs) and one or more sets of weights defining the one or more artificial neural network models. The processor/SoC 802 may be configured to receive input from and/or present output to the memory 806. The processor/SoC 802 may be configured to present and/or receive other signals (not shown). The number and/or types of inputs and/or outputs of the processor/SoC 802 may be varied according to the design criteria of a particular implementation. The processor/SoC 802 may be configured for low power (e.g., battery) operation.

The processor/SoC 802 may receive the signal RAW VIDEO and the signal SENS. In an example, the processor/SoC 802 may generate one or more video output signals (e.g., IR, RGB, etc.) and one or more data signals (e.g., DISPARITY MAP) based on the signal RAW VIDEO, the signal SENS, and/or other input. In some embodiments, the signals IR, RGB, and DISPARITY MAP may be generated based on analysis of the signal RAW VIDEO and/or objects detected in the signal RAW VIDEO. In an example, the signal RGB generally comprises color images (frames) in either an RGB or YUV color space. In an example, the signal RGB may be generated when the processor/SoC 802 is operating in a day mode. In an example, the signal RGB may be generated when the processor/SoC 802 is operating in a day mode. In an example, the signal IR generally comprises IR monochrome images (frames). In one example, the signal IR may comprise non-contaminated IR images (e.g., no structured light pattern) using ambient IR light when the processor/SoC 802 is operating in a day mode. In another example, the signal IR may comprise non-contaminated IR images (e.g., no structured light pattern) using IR LED illumination when the processor/SoC 802 is operating in a night mode. In yet another example, the signal IR may comprise contaminated IR images (e.g., the structured light pattern is present in at least a portion of the image) when the IR projector is turned on and the processor/SoC 802 is operating in either the day mode or night mode.

In various embodiments, the processor/SoC 802 may be configured to perform one or more of feature extraction, object detection, object tracking, and object identification.

For example, the processor/SoC 802 may determine motion information and/or depth information by analyzing a frame from the signal RAW VIDEO and comparing the frame to a previous frame. The comparison may be used to perform digital motion estimation. In some embodiments, the processor/SoC 802 may be configured to generate the video output signals RGB and IR comprising video data from the signal RAW VIDEO. The video output signals RGB and IR may be presented to the memory 806, the communications module 816, and/or the wireless interface 818. The signal DISPARITY MAP may be configured to indicate depth information associated with objects present in the images communicated by the signals RGB and IR. In an example, the image data carried by the signal RGB may be ignored (dropped) when the structured light pattern is present.

The memory 806 may store data. The memory 806 may implement various types of memory including, but not limited to, a cache, flash memory, memory card, random access memory (RAM), dynamic RAM (DRAM) memory, etc. The type and/or size of the memory 806 may be varied according to the design criteria of a particular implementation. The data stored in the memory 806 may correspond to a video file, motion information (e.g., readings from the sensors 814), video fusion parameters, image stabilization parameters, user inputs, computer vision models, and/or metadata information.

The lens 808 (e.g., camera lens) may be directed to provide a view of an environment surrounding the mono camera stereo device 800. The lens 808 may be aimed to capture environmental data (e.g., light). The lens 808 may be wide-angle lenses and/or fish-eye lenses (e.g., lenses capable of capturing a wide field of view). The lens 808 may be configured to capture and/or focus the light for the capture device 804. Generally, the image sensor 822 is located behind the lens 808. Based on the captured light from the lens 808, the capture device 804 may generate a bitstream and/or video data.

The communications module 816 may be configured to implement one or more communications protocols. For example, the communications module 816 and the wireless interface 818 may be configured to implement one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee. In some embodiments, the wireless interface 818 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the mono camera stereo device 800 is implemented as a wireless camera, the protocol implemented by the communications module 816 and wireless interface 818 may be a wireless communications protocol. The type of communications protocols implemented by the communications module 816 may be varied according to the design criteria of a particular implementation.

The communications module 816 and/or the wireless interface 818 may be configured to generate a broadcast signal as an output from the mono camera stereo device 800. The broadcast signal may send the video data RGB and/or IR, and/or the signal DISPARITY MAP to external devices. For example, the broadcast signal may be sent to a cloud storage service (e.g., a storage service capable of scaling on demand). In some embodiments, the communications module 816 may not transmit data until the processor/SoC 802 has performed video analytics to determine that an object is in the field of view of the mono camera stereo device 800.

In some embodiments, the communications module 816 may be configured to generate a manual control signal. The manual control signal may be generated in response to a signal from a user received by the communications module 816. The manual control signal may be configured to activate the processor/SoC 802. The processor/SoC 802 may be activated in response to the manual control signal regardless of the power state of the mono camera stereo device 800.

In some embodiments, the mono camera stereo device 800 may include a battery 820 configured to provide power for the various components of the mono camera stereo device 800. A multi-step approach to activating and/or disabling the capture device 804 based on the output of the motion sensor 814 and/or any other power consuming features of the mono camera stereo device 800 may be implemented to reduce a power consumption of the mono camera stereo device 800 and extend an operational lifetime of the battery 820. A motion sensor of the sensors 814 may have a very low drain on the battery 820 (e.g., less than 10 µW). In an example, the motion sensor of the sensors 814 may be configured to remain on (e.g., always active) unless disabled in response to feedback from the processor/SoC 802. Video analytics performed by the processor/SoC 802 may have a large drain on the battery 820 (e.g., greater than the motion sensor 814). In an example, the processor/SoC 802 may be in a low-power state (or power-down) until some motion is detected by the motion sensor of the sensors 814.

The mono camera stereo device 800 may be configured to operate using various power states. For example, in the power-down state (e.g., a sleep state, a low-power state) the motion sensor of the sensors 814 and the processor/SoC 802 may be on and other components of the mono camera stereo device 800 (e.g., the image capture device 804, the memory 806, the communications module 816, etc.) may be off. In another example, the mono camera stereo device 800 may operate in an intermediate state. In the intermediate state, the image capture device 804 may be on and the memory 806 and/or the communications module 816 may be off. In yet another example, the mono camera stereo device 800 may operate in a power-on (or high power) state. In the power-on state, the sensors 814, the processor/SoC 802, the capture device 804, the memory 806, and/or the communications module 816 may be on. The mono camera stereo device 800 may consume some power from the battery 820 in the power-down state (e.g., a relatively small and/or minimal amount of power). The mono camera stereo device 800 may consume more power from the battery 820 in the power-on state. The number of power states and/or the components of the mono camera stereo device 800 that are on while the mono camera stereo device 800 operates in each of the power states may be varied according to the design criteria of a particular implementation.

In some embodiments, the mono camera stereo device 800 may include a keypad, a touch pad (or screen), a doorbell switch, and/or other human interface devices (HIDs) 828. In an example, the sensors 814 may be configured to determine when an object is in proximity to the HIDs 828. In an example where the mono camera stereo device 800 is implemented as part of an access control application, the capture device 804 may be turned on to provide images for identifying a person attempting access, and illumination of a lock area, and/or for an access touch pad may be turned on.

In various embodiments, a low cost 3D sensing platform may be provided. The low cost 3D sensing platform may facilitate development of intelligent access control systems and smart security products such as smart video doorbells and door locks, payment systems, alarm systems, etc. In various embodiments, the low cost 3D sensing platform may include a vision system on chip (SoC), structured light projector, and IR or RGB-IR image sensor. In various embodiments, an RGB-IR CMOS image sensor may be utilized to obtain both a visible light image and an infrared (IR) image, for viewing and facial recognition, and also utilize the infrared (IR) image for depth sensing. In an example, the vision SoC may provide depth processing, anti-spoofing algorithms, 3D facial recognition algorithms, and video encoding on a single chip.

In various applications, the low cost 3D sensing platform in accordance with embodiments of the invention may significantly reduce system complexity while improving performance, reliability, and security. In an example, the vision SoC in accordance with embodiments of the invention may include, but is not limited to, a powerful image signal processor (ISP), native support for RGB-IR color filter arrays, and advance high dynamic range (HDR) processing, which may result in exceptional image quality in low-light and high-contrast environments. In an example, the vision SoC in accordance with embodiments of the invention may provide an architecture that delivers computational power for liveness detection and 3D facial recognition, while running multiple artificial intelligence (AI) algorithms for advanced features such as people counting and anti-tailgating.

In various embodiments, system cost may be reduced by using an RGB-IR sensor (e.g., one sensor and one lens versus two sensors and two lenses). In some embodiments, system cost may be further reduced by using an RGB-IR rolling shutter sensor (e.g., rolling shutter vs. global shutter). By controlling the structured light projector through software, the time sequence may be adjusted easily, providing improved flexibility. Power savings may be realized because the structured light projector may be used briefly by the software.

In various embodiments, a low cost structured light based 3D sensing system may be implemented. In an example, the 3D information may be used for 3D modeling and liveness determination. In an example, the low cost structured light based 3D sensing system may be used to unlock a door, disarm an alarm system, and/or allow "tripwire" access to a restricted region (e.g., of the garden, the garage, the house, etc.). In one example, the low cost structured light based 3D sensing system may be configured to recognize gardener/pool maintenance person and inhibit triggering an alarm. In another example, the low cost structured light based 3D sensing system may be configured to limit access to certain times and days of the week. In another example, the low cost structured light based 3D sensing system may be configured to trigger an alarm upon recognition of certain objects (e.g. restraining order is out against ex-spouse, alert 911 if that person is detected). In another example, the low cost structured light based 3D sensing system may be configured to allow alarm system re-programming privilege based on video/audio identification (e.g., only person X or Y is permitted to change access level or policy, add users, etc. even if the correct password is entered).

Various features (e.g., dewarping, digitally zooming, cropping, etc.) may be implemented in the processor 802 as hardware modules. Implementing hardware modules may increase the video processing speed of the processor 802 (e.g., faster than a software implementation). The hardware implementation may enable the video to be processed while reducing an amount of delay. The hardware components used may be varied according to the design criteria of a particular implementation.

The processor 802 is shown comprising a number of blocks (or circuits) 809a-809n. The blocks 809a-809n may implement various hardware modules implemented by the processor 802. The hardware modules 809a-809n may be configured to provide various hardware components to implement a video processing pipeline. The circuits 809a-809n may be configured to receive the pixel data RAW VIDEO, generate the video frames from the pixel data, perform various operations on the video frames (e.g., dewarping, rolling shutter correction, cropping, upscaling, image stabilization, etc.), prepare the video frames for communication to external hardware (e.g., encoding, packetizing, color correcting, etc.), parse feature sets, implement various operations for computer vision, etc. Various implementations of the processor 802 may not necessarily utilize all the features of the hardware modules 809a-809n. The features and/or functionality of the hardware modules 809a-809n may be varied according to the design criteria of a particular implementation. Details of the hardware modules 809a-809n and/or other components of the mono camera stereo device 800 may be described in association with U.S. patent application Ser. No. 15/931,942, filed on May 14, 2020, U.S. patent application Ser. No. 16/831,549, filed on Mar. 26, 2020, U.S. patent application Ser. No. 16/288,922, filed on Feb. 28, 2019 and U.S. patent application Ser. No. 15/593,493 (now U.S. Pat. No. 10,437,600), filed on May 12, 2017, appropriate portions of which are hereby incorporated by reference in their entirety.

The hardware modules 809a-809n may be implemented as dedicated hardware modules. Implementing various functionality of the processor 802 using the dedicated hardware modules 809a-809n may enable the processor 802 to be highly optimized and/or customized to limit power consumption, reduce heat generation and/or increase processing speed compared to software implementations. The hardware modules 809a-809n may be customizable and/or programmable to implement multiple types of operations. Implementing the dedicated hardware modules 809a-809n may enable the hardware used to perform each type of calculation to be optimized for speed and/or efficiency. For example, the hardware modules 809a-809n may implement a number of relatively simple operations that are used frequently in computer vision operations that, together, may enable the computer vision algorithm to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 809a-809n may enable computationally intensive operations (e.g., computer vision operations, video encoding, video transcoding, etc.) to be performed locally on the mono camera stereo device 800.

One of the hardware modules 809a-809n (e.g., 809a) may implement a scheduler circuit. The scheduler circuit 809a may be configured to store a directed acyclic graph (DAG). In an example, the scheduler circuit 809a may be configured to generate and store the directed acyclic graph. The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 809a may be configured to parse the acyclic graph to generate various operators. The operators may be scheduled by the scheduler circuit 809a in one or more of the other hardware modules 809a-809n. For example, one or more of the hardware modules 809a-809n may implement hardware engines configured to perform specific tasks (e.g., hardware engines designed to perform particular mathematical operations that are repeatedly used to perform computer vision operations). The scheduler circuit 809a may schedule the operators based on when the operators may be ready to be processed by the hardware engines 809a-809n.

The scheduler circuit 809a may time multiplex the tasks to the hardware modules 809a-809n based on the availability of the hardware modules 809a-809n to perform the work. The scheduler circuit 809a may parse the directed acyclic graph into one or more data flows. Each data flow may include one or more operators. Once the directed acyclic graph is parsed, the scheduler circuit 809a may allocate the data flows/operators to the hardware engines 809a-809n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 809a-809n (e.g., 809b) may implement a convolutional neural network (CNN) module. The CNN module 809b may be configured to perform the computer vision operations on the video frames. The CNN module 809b may be configured to implement recognition of the objects and/or events through multiple layers of feature detection. The CNN module 809b may be configured to calculate descriptors based on the feature detection performed. The descriptors may enable the processor 802 to determine a likelihood that pixels of the video frames correspond to particular objects (e.g., the people, pets, items, text, etc.).

The CNN module 809b may be configured to implement convolutional neural network capabilities. The CNN module 809b may be configured to implement computer vision using deep learning techniques. The CNN module 809b may be configured to implement pattern and/or image recognition using a training process through multiple layers of feature-detection. The CNN module 809b may be configured to conduct inferences against a machine learning model.

The CNN module 809b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 809b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 809b using dedicated hardware circuitry may enable calculating descriptor matching distances in real time.

The CNN module 809b may be a dedicated hardware module configured to perform feature detection of the video frames. The features detected by the CNN module 809b may be used to calculate descriptors. The CNN module 809b may determine a likelihood that pixels in the video frames belong to a particular object and/or objects in response to the descriptors. For example, using the descriptors, the CNN module 809b may determine a likelihood that pixels correspond to a particular object (e.g., a person, an item of furniture, a picture of a person, a pet, etc.) and/or characteristics of the object (e.g., a mouth of a person, a hand of a person, a screen of a television set, an armrest of a couch, a clock, etc.). Implementing the CNN module 809b as a dedicated hardware module of the processor 802 may enable the mono camera stereo device 800 to perform the computer vision operations locally (e.g., on-chip) without relying on processing capabilities of a remote device (e.g., communicating data to a cloud computing service).

The computer vision operations performed by the CNN module 809b may be configured to perform the feature detection on the video frames in order to generate the descriptors. The CNN module 809b may perform the object detection to determine regions of the video frame that have a high likelihood of matching the particular object. In one example, the types of object to match against (e.g., reference objects) may be customized using an open operand stack (enabling programmability of the processor 802 to implement various directed acyclic graphs each providing instructions for performing various types of object detection). The CNN module 809b may be configured to perform local masking to the region with the high likelihood of matching the particular object(s) to detect the object.

In some embodiments, the CNN module 809b may determine the position (e.g., 3D coordinates and/or location coordinates) of various features (e.g., the characteristics) of the detected objects. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lens 808 may represent one coordinate (e.g., a location coordinate on a third axis) for a depth location of the body part in 3D space. Using the location of various body parts in 3D space, the processor 802 may determine body position, and/or body characteristics of the people in a field of view of the mono camera stereo device 800.

The CNN module 809b may be pre-trained (e.g., configured to perform computer vision to detect objects based on the training data received to train the CNN module 809b). For example, the results of training data (e.g., a machine learning model) may be pre-programmed and/or loaded into the processor 802. The CNN module 809b may conduct inferences against the machine learning model (e.g., to perform object detection). The training may comprise determining weight values (e.g., neural network weights) for each of the layers. For example, weight values may be determined for each of the layers for feature extraction (e.g., a convolutional layer) and/or for classification (e.g., a fully connected layer). The weight values learned by the CNN module 809b may be varied according to the design criteria of a particular implementation.

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 809b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, furniture, etc.) in higher layers and the last layer may be a classifier that uses the higher level features.

The hardware module 890a-890n may execute data flows directed to computer vision, feature extraction, and feature matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 809b to extract features from the training data may be varied according to the design criteria of a particular implementation.

Each of the hardware modules 809a-809n may implement a processing resource (or hardware resource or hardware engine). The hardware engines 809a-809n may be operational to perform specific processing tasks. In some configurations, the hardware engines 809a-809n may operate in parallel and independent of each other. In other configurations, the hardware engines 809a-809n may operate collectively among each other to perform allocated tasks. One or more of the hardware engines 809a-809n may be homogenous processing resources (all circuits 809a-809n may have the same capabilities) or heterogeneous processing resources (two or more circuits 809a-809n may have different capabilities).

The functions illustrated by the diagrams of FIGS. 1-13 may be implemented utilizing one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data; and
   a processor configured to (i) generate a reference image and a target image from said pixel data, (ii) perform disparity operations on said reference image and said target image, and (iii) build a disparity angle map in response to said disparity operations, wherein said disparity operations comprise (a) selecting a plurality of grid pixels, (b) measuring a disparity angle for each grid pixel, (c) calculating a plurality of coefficients by resolving a surface formulation for the disparity angle map of the grid pixels, and (d) generating values in the disparity angle map for said pixel data utilizing said coefficients.

2. The apparatus according to claim 1, wherein said processor is further configured to build a disparity map by performing pattern shift matching using said disparity angle map.

3. The apparatus according to claim 2, wherein said processor is further configured to perform said pattern shift matching by applying an oriented block matching process utilizing said disparity angle map.

4. The apparatus according to claim 1, wherein said processor is further configured to build said disparity angle map by performing an offline calibration procedure comprising capturing a first image containing a speckle pattern projected on a wall at a first distance and capturing a second image containing said speckle pattern projected on said wall at a second distance.

5. The apparatus according to claim 1, wherein said processor is further configured to build said disparity angle map by performing an online calibration procedure comprising capturing a first image containing a speckle pattern projected on an object at a first distance and capturing a second image containing said speckle pattern projected on said object at a second distance.

6. The apparatus according to claim 1, wherein said processor is further configured to calculate said plurality of coefficients by resolving said surface formulation for the disparity angle map of the grid pixels by applying a regression algorithm to a parametric surface containing said grid pixels.

7. The apparatus according to claim 6, wherein said regression algorithm comprises a least square regression algorithm.

8. The apparatus according to claim 6, wherein said parametric surface comprises a cubic parametric surface.

9. The apparatus according to claim 1, further comprising:
   a camera configured to generate said pixel data; and
   a structured light projector configured to project a speckle pattern.

10. The apparatus according to claim 9, wherein said processor is further configured to:
    generate said reference image comprising said speckle pattern projected on an object at a first distance from said camera;
    generate said target image comprising said speckle pattern projected on said object at a second distance from said camera; and
    measure said disparity angle for each grid pixel by determining a pattern shift between said speckle pattern in said reference image and said speckle pattern in said target image.

11. A method of mounting calibration of a structured light projector in a mono camera stereo system comprising:
    receiving pixel data at an interface;
    generating a reference image and a target image from said pixel data using a processor;
    performing disparity operations on said reference image and said target image; and
    building a disparity angle map in response to said disparity operations, wherein said disparity operations comprise (a) selecting a plurality of grid pixels, (b) measuring a disparity angle for each grid pixel, (c) calculating a plurality of coefficients by resolving a surface formulation for the disparity angle map of the grid pixels, and (d) generating values in a disparity angle map for said pixel data utilizing said coefficients.

12. The method according to claim 11, further comprising building a disparity map using said processor by performing pattern shift matching using said disparity angle map.

13. The method according to claim 12, further comprising:
    performing said pattern shift matching by applying an oriented block matching process utilizing said disparity angle map.

14. The method according to claim 11, further comprising:
    building said disparity angle map by performing an offline calibration procedure comprising capturing a first image containing a speckle pattern projected on a wall at a first distance and capturing a second image containing said speckle pattern projected on said wall at a second distance.

15. The method according to claim 11, further comprising:
    building said disparity angle map by performing an online calibration procedure comprising capturing a first image containing a speckle pattern projected on an object at a first distance and capturing a second image containing said speckle pattern projected on said object at a second distance.

16. The method according to claim 11, further comprising:
    calculating said plurality of coefficients by resolving said surface formulation for the disparity angle map of the grid pixels by applying a regression algorithm to a parametric surface containing said grid pixels.

17. The method according to claim 16, wherein said regression algorithm comprises a least square regression algorithm.

18. The method according to claim 16, wherein said parametric surface comprises a cubic parametric surface.

19. The method according to claim 11, further comprising:
   generating said pixel data using a camera; and
   projecting a speckle pattern on an object using a structured light projector.

20. The method according to claim 19, further comprising:
   generating said reference image comprising said speckle pattern projected on an object at a first distance from said camera;
   generating said target image comprising said speckle pattern projected on said object at a second distance from said camera; and
   measuring said disparity angle for each grid pixel using said processor to determine a pattern shift between said speckle pattern in said reference image and said speckle pattern in said target image.

\* \* \* \* \*